United States Patent
Takahashi et al.

(10) Patent No.: US 8,588,460 B2
(45) Date of Patent: Nov. 19, 2013

(54) ELECTRONIC WATERMARK EMBEDDING DEVICE, ELECTRONIC WATERMARK DETECTING DEVICE, AND PROGRAMS THEREFOR

(75) Inventors: Jun Takahashi, Kawasaki (JP); Kensuke Kuraki, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 760 days.

(21) Appl. No.: 12/659,079

(22) Filed: Feb. 24, 2010

(65) Prior Publication Data

US 2010/0158311 A1     Jun. 24, 2010

Related U.S. Application Data

(63) Continuation of application No. PCT/JP2007/067014, filed on Aug. 31, 2007.

(51) Int. Cl.
  *G06K 9/00*   (2006.01)
  *G06K 9/46*   (2006.01)
  *G06K 9/32*   (2006.01)
  *G06K 9/48*   (2006.01)

(52) U.S. Cl.
  CPC .................................. *G06K 9/48* (2013.01)
  USPC ............................ 382/100; 382/190; 382/298

(58) Field of Classification Search
  None
  See application file for complete search history.

(56) References Cited

U.S. PATENT DOCUMENTS

| | | | |
|---|---|---|---|
| 6,983,056 | B1 | 1/2006 | Amano |
| 7,006,655 | B2 | 2/2006 | Taniguchi et al. |
| 7,190,805 | B2 | 3/2007 | Silverstein |
| 7,499,565 | B2 | 3/2009 | Fujii et al. |
| 2009/0021793 | A1 | 1/2009 | Lu et al. |

FOREIGN PATENT DOCUMENTS

| | | | |
|---|---|---|---|
| JP | 2001-078006 A | | 3/2001 |
| JP | 2001-346032 A | | 12/2001 |
| JP | 2002-111994 | | 4/2002 |
| JP | 2002-232698 A | | 8/2002 |
| JP | 2004-289783 A | | 10/2004 |
| JP | 2004-336807 A | | 11/2004 |
| JP | 2004336807 A | * | 11/2004 |
| JP | 3628312 | | 12/2004 |

(Continued)

OTHER PUBLICATIONS

Inoue Seiki et al., Practical Image Processing Learning by C Languages, pp. 131-135, Ohmsha Ltd, 1999.*

(Continued)

*Primary Examiner* — Kimyen Vu
*Assistant Examiner* — Fred Hu
(74) *Attorney, Agent, or Firm* — Staas & Halsey LLP

(57) ABSTRACT

An electronic watermark embedding device that embeds a graphic pattern representing information in image data includes a signaling feature period changing unit configured to change a period of signaling feature of a graphic pattern, a graphic pattern embedding unit configured to embed the graphic pattern in the image data as a period of the signaling feature changed by the signaling feature period changing unit, and an embedment region detecting unit configured to detect an embedding position where the graphic pattern is embedded from a region of the image data other than a background, whereby the signaling feature period changing unit changes the period of the signaling feature while maintaining the signaling feature when the image data undergo image enlargement or reduction processing, and the graphic pattern embedding unit embeds the graphic pattern in the embedding position on the region of the image data other than the background.

14 Claims, 22 Drawing Sheets

(56) References Cited

FOREIGN PATENT DOCUMENTS

| JP | 2005-524348 T | | 8/2005 |
|---|---|---|---|
| JP | 2006-295606 A | | 10/2006 |
| JP | 2007-208452 | | 8/2007 |
| JP | 2007208452 A | * | 8/2007 |

OTHER PUBLICATIONS

Japanese Office Action issued Jun. 7, 2011 in corresponding Japanese Patent Application 2009-529940.

International Search Report for PTC/JP2007/067014, mailed on Nov. 20, 2007.

J.T. Brassil et al., "Electronic Marking and Identification Techniques to Discourage Document Copying" in Proc. IEEE INFOCOM, 1994, vol. 3, pp. 1278-1287.

Nakamura Yosuhiro et al., "Embedding Signature into Japanese Printed Documents for Copyright Protection", Information Processing Society of Japan 50th National Convention, vol. 3, pp. 203-204, 1994.

Tsujiai Hidekazu et al, "Digital Watermark in Lettering Images by Using Character Shape", The Transactions of the Institute of Electronics, Information, and Communication Engineers, vol. 39, pp. 2175-2177, 1999.

Inoue Seiki et al., "Practical Image Processing Learning" by C Languages, pp. 131-135, Ohmsha, Ltd., 1999.

* cited by examiner

1301

1302

1402

1401

1404

1403

| 0 | a | a | 0 | 0 | x | x | 0 | 0 | a | a | 0 | 0 | x | x | 0 |
|---|---|---|---|---|---|---|---|---|---|---|---|---|---|---|---|
| 0 | a | a | 0 | 0 | a | a | 0 | 0 | a | a | 0 | 0 | a | a | 0 |
| 1 | 1 | 1 | 1 | 1 | 1 | 1 | 1 | 1 | 1 | 1 | 1 | 1 | 1 | 1 | 1 |

2701

256 DOTS

256 DOTS

2901

2902

WATERMARK INFORMATION ARRAY

2903

2904

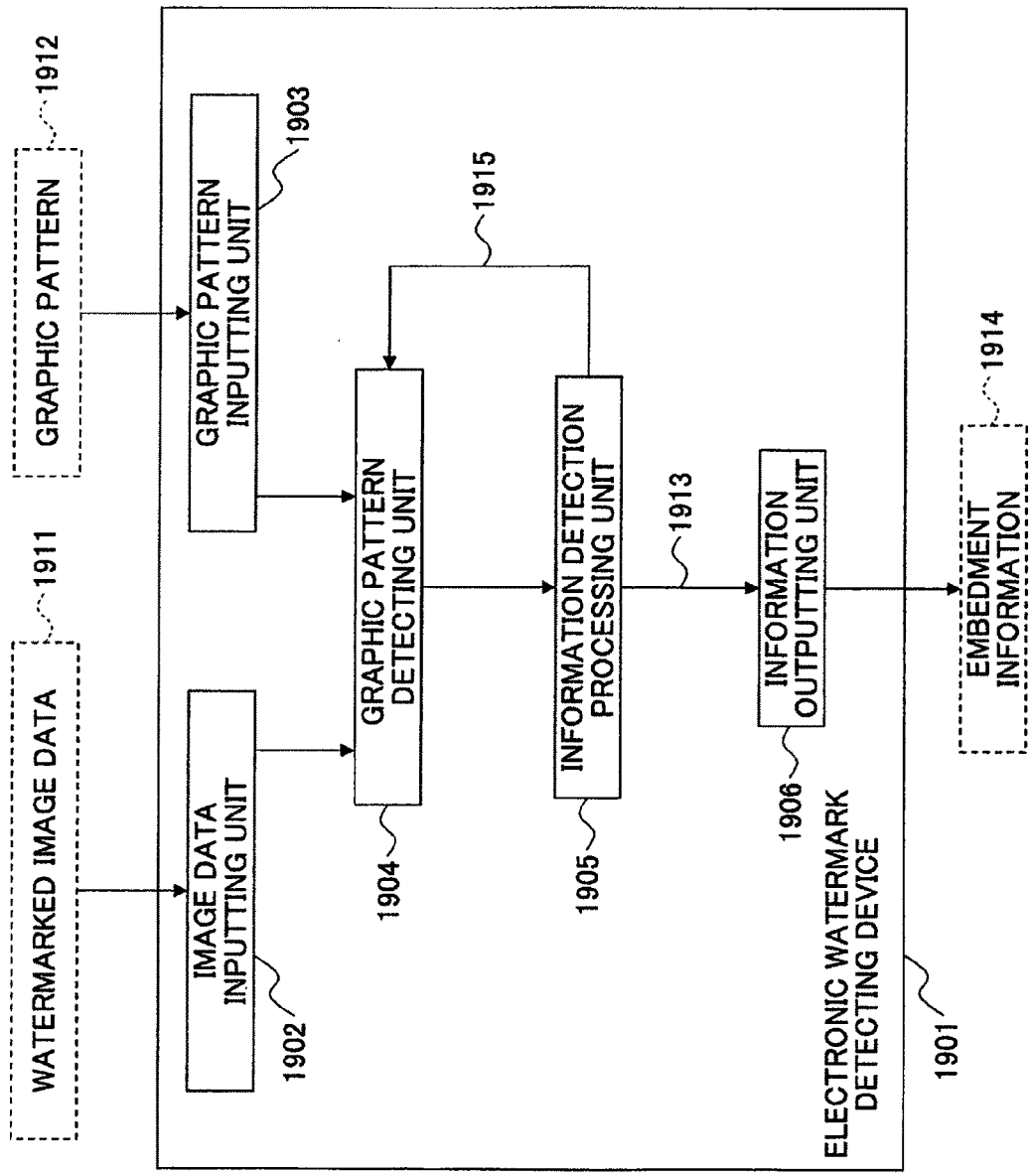

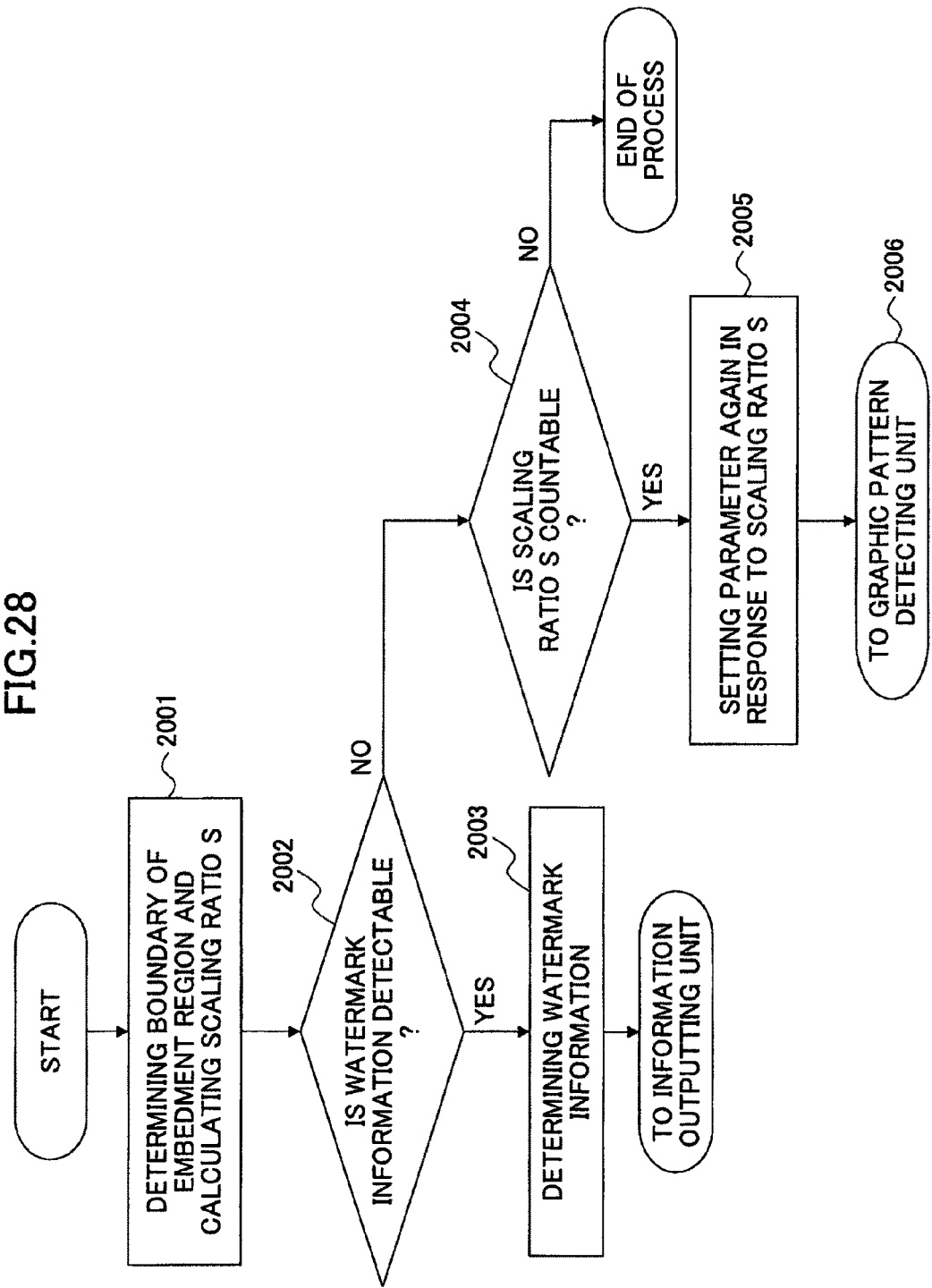

2101

2102

2103

2104

2105 → WATERMARK INFORMATION 1101

ELECTRONIC WATERMARK EMBEDDING DEVICE, ELECTRONIC WATERMARK DETECTING DEVICE, AND PROGRAMS THEREFOR

CROSS-REFERENCE TO RELATED APPLICATIONS

This application is a U.S. continuation application filed under 35 USC 111(a) and 365(c) of PCT/JP2007/067014 filed on Aug. 31, 2007, the entire contents of which are incorporated herein by reference.

FIELD

The embodiments discussed herein are related to an electronic watermark embedding device, an electronic watermark detecting device, and programs therefore.

BACKGROUND

A technique called "electronic watermark" is provided to embed a copyright notice or tracking information of a person who reproduces a copyrighted work in electronic data such as images and sounds.

The technique of the electronic watermark enables embedding the information in an object without being perceived by persons because the information is secretly embedded as a so-called "watermark".

Further, the technique of the electronic watermark enables confirming an unauthorized duplication of a copyrighted work, and tracing leakage of in-company information by detecting the embedment information from the electronic data. As to an electronic medium which may be printed as a document image, it is preferable that the embedment information be detected from not only the electronic data but also a printed paper medium.

Non-Patent Document 1 discloses a method of embedment information among words by horizontally shifting the locations of the words (FIG. 1).

Non-Patent Document 2 discloses a method of enlarging, reducing and rotating a character to embed the information in an electronic document (FIG. 1).

Non-Patent Document 3 and Patent Document 1 disclose a method of embedding a character with information by changing the shape of the character.

Patent Document 7 discloses a method of embedding a watermark by extracting a character image from a document image and forming the character image with a predetermined dot pattern.

Patent Documents 2 and 3 disclose a method of embedment information in a background of a document image so that information to be embedded is expressed by a specific dot pattern and superimposed onto the background of the document image.

Patent Document 4 discloses, as a method of embedment information in a portion other than a background of a document image, a method of providing a criterion of changing modes of a binary image and a priority order of the modes based on a visual feature of human for the binary image, and inserting the watermarks while sequentially changing the modes from a pixel having a higher priority.

Patent Document 5 discloses a method of dividing a binary image into plural blocks, and changing a pixel value so that residual values obtained from the numbers of black pixels of the blocks divided and a reference value and correspond to watermark information.

Patent Document 6 discloses a method of inserting information into a portion having a predetermined aerial relationship with the edge.

[Patent Document 1] Japanese Laid-open Patent Publication No. 2001-078006

[Patent Document 2] Japanese Patent No. 3628312

[Patent Document 3] Japanese Laid-open Patent Publication No. 2001-346032

[Patent Document 4] Japanese Laid-open Patent Publication No. 2004-289783

[Patent Document 5] Japanese Laid-open Patent Publication No. 2002-232698

[Patent Document 6] Japanese National Publication of International Patent Application No. 2005-524348

[Patent Document 7] Japanese Laid-open Patent Publication No. 2006-295606

[Non-Patent Document 1] J. T. Brassil, S. Low, N. F. Maxemchuk, L. O'Gorman, "Electronic marking and identification techniques to discourage document copying", in *Proc. IEEE INFOCOM '94*, vol. 3, pp. 1278-1287, 1994

[Non-Patent Document 2] Nakamura Yasuhiro, Matsui Kineo, "Embedding Signature into Japanese Printed Documents for Copyright Protection", *Information Processing Society of Japan 50th National Convention*, vol. 3, pp. 203-204, 1994

[Non-Patent Document 3] Tsujiai Hidekazu, Uetsuji Masayoshi, "Digital Watermark in Lettering Images by Using Character Shape", *The transactions of the Institute of Electronics, Information and Communication Engineers*, vol. 39, pp. 2175-2177, 1999

[Non-Patent Document 4] Inoue Seiki, Yagi Nobuyuki, Hayashi Masaki, Nakasu Eisuke, Mitani Kouji, Okui Masato, *Practical Image Processing learning by C language*, p. 131-135, Ohmsha, Ltd., 1999

SUMMARY

According to an aspect of the embodiment, an electronic watermark embedding device that embeds a graphic pattern representing information in image data, the electronic watermark embedding device includes a signaling feature period changing unit configured to change a period of signaling feature of a graphic pattern, a graphic pattern embedding unit configured to embed the graphic pattern in the image data as a period of the signaling feature changed by the signaling feature period changing unit, and an embedment region detecting unit configured to detect an embedding position where the graphic pattern is embedded from a region of the image data other than a background, whereby the signaling feature period changing unit changes the period of the signaling feature of the graphic pattern while maintaining the signaling feature when the image data undergo image enlargement or reduction processing, and the graphic pattern embedding unit embeds the graphic pattern in the embedding position on the region of the image data other than the background.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 27 is a functional block chart illustrating the entire structure of an electronic watermark detecting device of an embodiment of the present invention.

FIG. 28 is a flow chart illustrating a process of detecting information from a graphic pattern with the information detection processing unit illustrated in FIG. 27.

DESCRIPTION OF EMBODIMENT(S)

Figure 1:
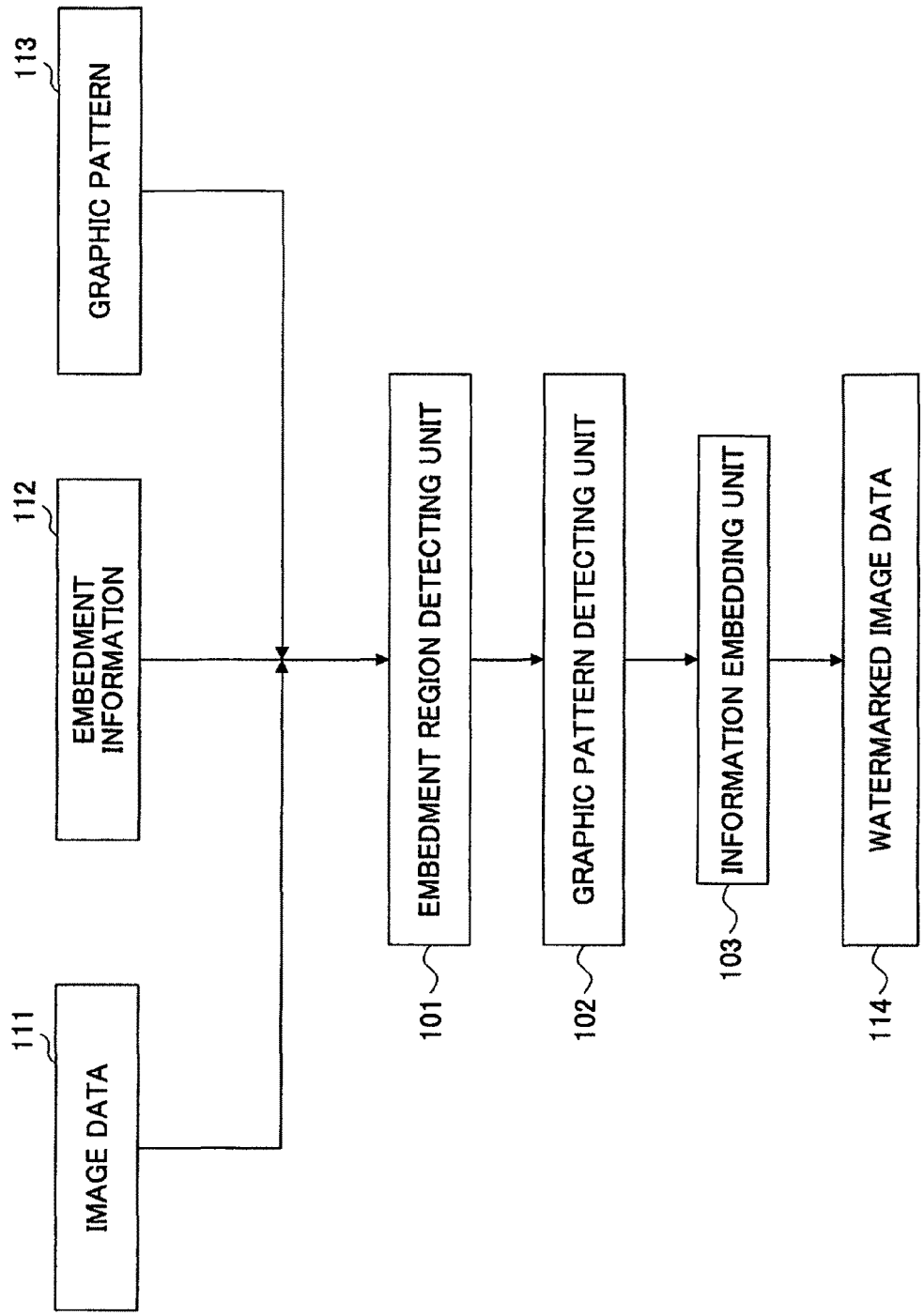
FIG. 1 illustrates a configuration example of an electronic watermark embedding method.

Hereinafter, numerical references typically designate as follows: 101: embedment region detecting unit; 102: graphic pattern selecting unit; 103: information embedding unit; 1601: electronic watermark embedding device; 1602: graphic pattern inputting unit; 1603: image data inputting unit; 1604: embedment information inputting unit; 1605: graphic pattern region detecting unit; 1606: information embedding processing unit; 1607: image data outputting unit; 1901: electronic watermark detecting device; 1902: image data inputting unit; 1903: graphic pattern inputting unit; 1904: graphic pattern detecting unit; 1905: information detection processing unit; and 1906: information outputting unit.

An electronic watermark technique may involve embedment of the information in a character, a character string, a background of a document image, or a portion other than the background.

However, it is difficult to visually distinguish the embedment information in the electronic watermark technique. It becomes further difficult when an object to be distinguished is printed and then processed by copying, cutting, enlarging and reducing. Thus, there is difficulty in embedding document image data with information so that the information is stably detectable.

Especially, it is difficult to stably detect the information after a document undergoes image enlargement and reduction processing such as N-up printing like 2-in-1 printing and 4-in-1 printing, and a copy output format (size) change like size reduction from A4 to B5 and size enlargement from B5 to A4.

Embedding methods may have a problem that information to be embedded depends largely on a character in document image data. Detecting methods may have a problem that a characters is not properly extracted in embedment information and detecting the information.

Further, the embedding methods may have a problem that a dot pattern embedded in a background of image data is glaring.

Further, the detecting methods may have a problem that the probability of losing embedment information becomes high after printing and copying are repeated to cause a thin spot or blurring of portions like a character outline and a word segmentation, in which the information is embedded.

Further, the detecting methods may have a problem that a scaling ratio of embedment information is not detectable through a trial and error process after the embedment information such as a dot pattern or an altered pixel is lost.

Therefore, an embodiment of the present invention relates to an electronic watermark embedding method of embedding image data with information so as to not be easily perceived by persons, and an electronic watermark detecting method of detecting embedment information from a scanned image obtained from a printed material of watermarked image data, solving the above-mentioned problems.

Next, a preferred embodiment of the present invention is explained with reference to accompanying drawings.

Information is embedded in image data by the electronic watermark method. The embedment information includes a graphic pattern which has a signaling feature of a periodical pattern detectable by a filter. Even though the graphic pattern is subjected to an enlargement or reduction process, the above signaling feature is maintained.

A structure carrying out the electronic watermark method includes an embedment region detecting unit configured to detect a region where the graphic pattern is embedded and located other than a background in the image data, a graphic pattern selecting unit configured to set a scaling ratio of the image data and select one of the graphic patterns corresponding to the embedment information and the scaling ratio, and an information embedding unit configured to generate watermarked image data by embedding the selected graphic data in the region.

The graphic pattern may be configured to include a signaling feature, of which period is changed to maintain the signaling feature detectable even after the image data undergo enlargement or reduction processing.

The graphic pattern may be configured to be a pattern obtained by altering neighbor pixels near a portion related to a signaling feature of the graphic pattern to have pixel values different from those of the neighbor pixels.

The graphic pattern may be configured to be a pattern including an isolated point in addition to the signaling feature inherent in the graphic pattern.

The graphic pattern selecting unit does not uniquely determine a scaling ratio. The graphic pattern selecting unit includes a function unit configured to select plural ones from plural graphic patterns in response to the embedment information, and a function unit configured to randomly select one or plural ones from the selected plural ones of the graphic patterns in association with plural scaling ratios.

Further, the electronic watermark detecting method is a method of detecting information embedded in the watermarked image data. The electronic watermark detecting method includes a function unit configured to detect a graphic pattern from a region other than a background of the watermarked image data subjected to an enlargement or reduction process, and a function process configured to detect embedment information corresponding to the detected graphic pattern.

The electronic watermark detecting method includes a function unit configured to calculate a scaling ratio from the detected graphic pattern, and a function unit configured to detect the graphic pattern again in association with the scaling ratio.

Next, the embodiment is described in detail in reference to figures.

FIG. 1 illustrates a configuration example of an electronic watermark embedding method.

According to the electronic watermark embedding method, an embedment region detecting unit 101, a graphic pattern selecting unit 102, and an information embedding unit 103 are provided as illustrated in FIG. 1, and embedment information 112 is embedded in predetermined image data 111 as a watermark.

The embedment region detecting unit 101 detects an embedment region where a graphic pattern 113 is embeddable from a region where a character, a drawing, a photograph, a halftone dot or the like exist on the image data 111 except for a background, and report information of the embedment region to the graphic pattern selecting unit 102.

The graphic pattern selecting unit 102 selects a graphic pattern 113 corresponding to the embedment information 112 and the scaling ratio for the embedment region reported from the embedment region detecting unit 101.

The scaling ratio may be a predetermined one or plural types as candidates.

Here, the scaling ratio is a enlargement ratio or a reduction ratio respectively for an image enlargement or reduction process to occur in future to image data embedded with a watermark by the electronic watermark embedding method (hereinafter, referred to as watermarked image data 114).

The watermarked image data 114 which are obtained by the electronic watermark embedding method at the scaling ratio by selecting and using the graphic pattern 113 corresponding to the scaling ratio undergo image enlargement or reduction processing. In this case, the graphic pattern 113 is detected with a high probability from the image data that undergo image enlargement or reduction processing, and the embedment information 112 is detected from the watermarked image data 114.

When the scaling ratio is not known, the graphic pattern selecting unit 102 selects plural graphic patterns 113 corresponding to the embedment information 112 and randomly select plural ones of the selected plural graphic patterns 113 corresponding to mutually different scaling ratios.

The information embedding unit 103 generates the watermarked image data 114 with the embedment information 112 embedded in it by embedding the graphic pattern, which is selected as described above by the graphic pattern selecting unit 102, in the embedment region reported by the embedment region detecting unit 101.

The graphic patterns 113 have a periodic pattern which is detectable by a filter as its signaling feature. After the watermarked image data undergo image enlargement or reduction processing, the graphic patterns 113 are configured to maintain the signaling feature as described below.

The embedment region detecting unit 101 corresponds to, for example, a graphic pattern region detecting unit 1605 illustrated in FIG. 22 described below.

The graphic pattern selecting unit 102 and the information embedding unit 103 correspond to, for example, an information embedding processing unit 1606 illustrated in FIG. 22 described below.

The electronic watermark detecting method of the embodiment includes a graphic pattern detecting unit and an information detecting unit. The embedment information 112 embedded in the watermarked image data 114 by the electronic watermark embedding method as described above in reference to FIG. 1 is detected by the electronic watermark detecting method.

The graphic pattern detecting unit detects the graphic pattern 113 embedded in the region other than the background in the watermarked image data 114.

The above information detecting unit detects the embedment information 112 corresponding to the graphic pattern 113 detected as described above.

The graphic pattern detecting unit and the information detecting unit correspond respectively to, for example, a graphic pattern detecting unit 1904 and an information detection processing unit 1905, described below in reference to FIG. 27.

Detailed explanation is given of the structure of the embodiment.

A graphic pattern 113 may be embedded in an embedment region. There exist a character, a drawing, a photograph, and a halftone dot in the embedment region, which is other than a background of predetermined image data 111. Hereinafter, the region other than the background is referred to as "foreground".

According to the electronic watermark embedding method of the embodiment, information which is difficult to be perceived by persons and is stably detectable may be embedded in the foreground of the image data 111 by using a specific pattern (i.e. graphic pattern 113) as the information.

It is possible to use the structure of the graphic pattern 113 used in embedding the information disclosed in U.S. patent application Ser. No. 11/862,592 filed on Sep. 27, 2007 (Japanese Patent Application No. 2006-266015 filed on Sep. 28, 2006), which is incorporated by reference.

The structure of the graphic pattern 113 used for the electronic watermark embedding method of the embodiment is described below.

The graphic pattern 113 is a pattern embedded in the foreground as "watermark" having a periodic pattern detectable with a filter.

For example, a pattern 203 is obtained by combining a pattern 201 and a pattern 202. The pattern 203 is used as a graphic pattern 113.

Figure 2:
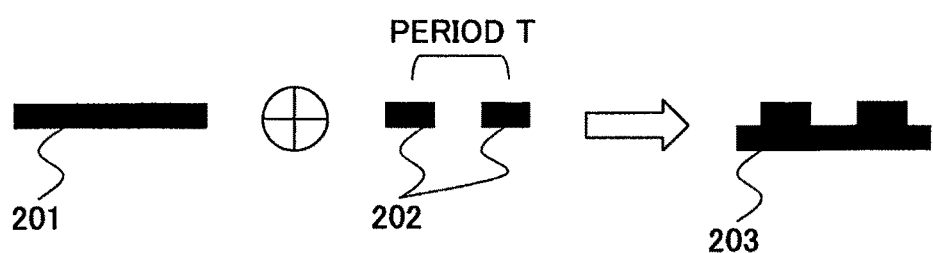
FIG. 2 illustrates a first example of a graphic pattern applicable to the electronic watermark embedding method illustrated in FIG. 1.

The pattern 201 of FIG. 2 is used to detect the embedment region where the graphic pattern 203 (i.e. the graphic pattern 113) is embedded in the image data 111. Hereinafter, the pattern 201 is referred to as "basic pattern".

It is preferable that the pixel value of the basic pattern be largely different from the pixel value of the background of the image data 111 subjected to embedment of the graphic pattern 203.

The pattern 202 has a signaling feature configured to change its pixel values at a predetermined period T. The signaling feature is used to detect the graphic pattern 203 from the watermarked image data 114 and to determine a content of the embedment information 112.

The graphic pattern 203 is formed to embed its basic pattern 201 in the foreground of the image data 111.

Hereinafter, the pattern 202 is referred to as "directional pattern".

The pixel value of the directional pattern 202 may be a value the same as or close to the pixel value of the basic pattern 201 as long as the pixel value is different from the pixel value of the background of the image data 111 in which the graphic pattern 203 is embedded.

Ordinarily, as long as the directional pattern 202 is formed to have the periodic pattern, the structure of the graphic pattern 203 is not specifically limited.

Figure 3:
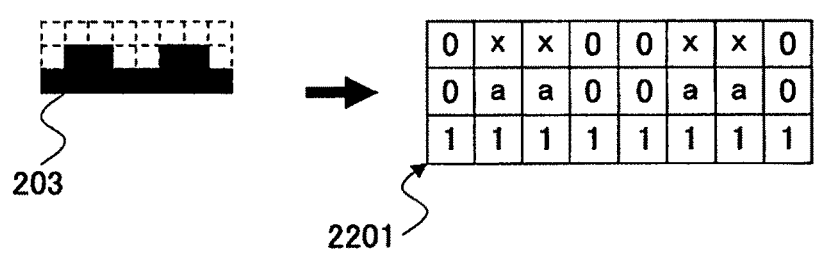
FIG. 3 illustrates an example of a two-dimensional graphic pattern applicable to the electronic watermark embedding method illustrated in FIG. 1.

The graphic pattern 203 of FIG. 2 is generated as (converted to) data of two-dimensional matrix 2201 as illustrated in, for example, FIG. 3.

The two-dimensional matrix 2201 is formed by a value "1" designating the basic pattern 201, a value "0" designating a portion other than the basic pattern 201, a value "a" designating the directional pattern 202, and a value designating a portion which is not used for pattern matching described below. When it is not determined whether the portion which is not used for pattern matching is in a background or a foreground, the portion having the value x is defined as "don't care". The elements of the two-dimensional matrix 2201 may conform to one or plurality of pixels of the image data 111.

Figure 4:
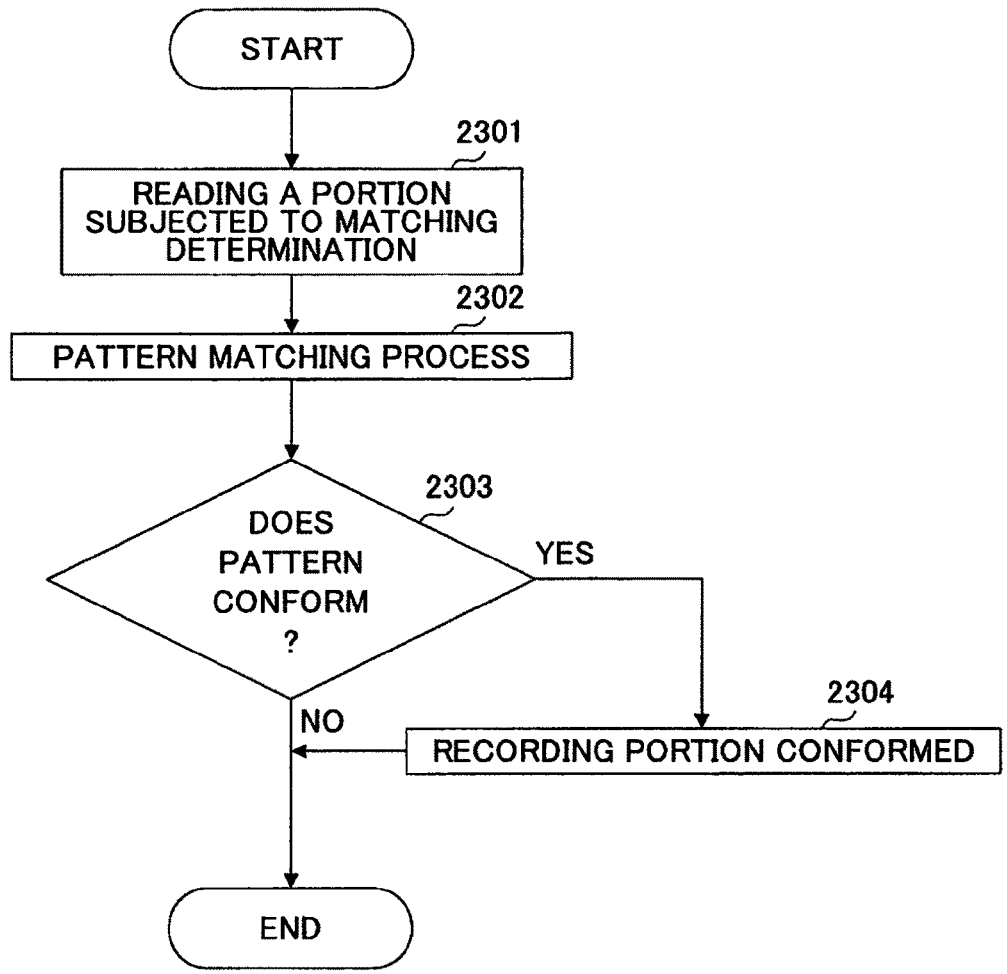
FIG. 4 is a processing flow chart explaining an embedment region detection process of the electronic watermark embedding method illustrated in FIG. 1.

FIG. 4 is a flowchart of an embedment region detection process carried out by the embedment region detecting unit 101.

Referring to FIG. 4, a portion subjected to matching determination is read from the image data 111 (Step 2301). The size of the portion subjected to matching determination changes depending on a type of the graphic pattern 113 (203). For example, the portion subjected to matching determination is obtainable by sequentially scanning pixels forming the image data.

Next, a pattern matching process is carried out (Step 2302). It is determined whether the portion subjected to matching determination matches the basic pattern 201 forming the graphic pattern 203 (Step 2303). It is determined whether the portion subjected to matching determination conforms to the basic pattern 201 forming the graphic pattern 203 (Step 2303).

It is checked whether the basic pattern 201 of the graphic pattern 203 conforms to the foreground of the image data 111 and whether the portion other than the basic pattern 201 of the graphic pattern 203 conforms to the background of the image data 111.

For example, the portions "a" of the directional pattern 202 and the portions "x" which is not used for the pattern matching are excluded from the pattern matching.

Specifically, when the elements of the two-dimensional matrix 2201 for the graphic pattern 203 have one dot, a region having a size of 8×3 (eight dots width and three dots height) corresponding to the size of the two-dimensional matrix 2201 is extracted as the portion subjected to matching determination.

The two-dimensional matrix 2201 is superimposed onto the extracted region to check whether the following two conditions (1) and (2) are satisfied.

(1) The foreground of the image data is superimposed onto the entire portions of "1" of the two-dimensional matrix 2201. Said differently, all pixel values of the entire portions of "1" of the two-dimensional matrix 2201 conform to pixel values of the foreground currently superimposed onto the image data 111.

(2) The background of the image data is superimposed onto the entire portions of "0" of the two-dimensional matrix 2201. Said differently, all pixel values of the entire portions of "0" of the two-dimensional matrix 2201 conform to pixel values of the background currently superimposed onto the image data 111.

Figure 5:
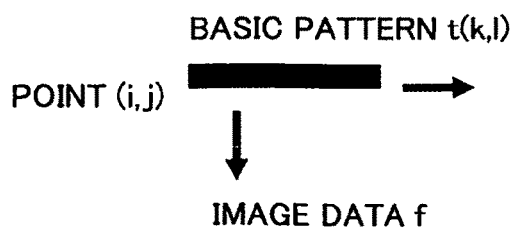
FIG. 5 illustrates a pattern matching process in the embedment region detection process illustrated in FIG. 4.

Next, referring to FIG. 3, the pixel value of a black pixel is set to "1", and the pixel value of a white pixel is set to "0". Referring to FIG. 5, the pixel value of a point (i, j) is represented by f(i, j). Further, the pattern matching processing is carried out using a matrix element t(k, l) corresponding to a point (k, l) on the basic pattern t (202) having the size of M×N. In case of the two-dimensional matrix 2201, M=8 and N=1. At this time, when the value of following Formula 1 becomes 0, it is determined that above condition (1) is satisfied.

$$\sum_{l=0}^{b-1}\sum_{k=0}^{a-1} |f(i+k, j+l) - t(k, l)| \quad \text{Formula 1}$$

As to condition (2), the portions of "0" of the two-dimensional matrix 2201 are used instead of the basic pattern t(202) in condition (1) to thereby carry out a pattern matching processing for condition (2) in a manner similar to the condition (1).

When these conditions (1) and (2) are satisfied, it is deemed that the portion subjected to matching determination conforms to the basic pattern 201 (Yes in Step 2303 of FIG. 4), a coordinate point (i, j) of the corresponding image data 111 is stored in a memory (Step 2304).

By causing the entire image data 111 or a part of the image data 111 undergo processing as described above, plural embedment regions for embedding the graphic patterns are detected from the image data 111.

With the electronic watermark embedding method of the embodiment, all or a part of the image data is divided into plural regions, and a graphic pattern 113, which corresponds to watermark information to be embedded and a scaling ratio, is embedded in the divided regions of the image data 111. Thus, watermarked image data 114 are generated. Further, by detecting the graphic pattern 113 embedded in the watermarked image data 114, the embedment information 112 is detected.

Next, an explanation is given on the presumption that the white pixel region is the background region, and the black pixel region is the foreground region. However, the embodiment is not limited thereto. For example, a portion having a high brightness value in a color image may be a background portion, and a portion having a low brightness value in the color image may be a foreground portion. Further, the color component of the directional pattern may be a color component the same as the basic pattern detected from the foreground. In this way, the present invention is applicable to an image other than a black-and-white image.

Next, embedment and detection of information in the electronic watermark embedding method and the electronic watermark detecting method of the embodiment are described in detail.

Before the electronic watermark embedding method of the embodiment, predetermined plural types of graphic patterns 113 are previously prepared in correspondence with the embedment information 112 and the scaling ratios S of the image data 111. Here, in case of S>1.0, the image enlargement process is considered. In case of 0<S<1.0, the image reduction process is considered. In case of S=1.0, the image enlargement process and the image reduction process are not considered. When the information is embedded, the graphic pattern 113 corresponding to the embedment information 112 and the scaling ratio S is selected. The selected graphic pattern 113 is embedded in the image data as the watermark. One or a plurality of types of the scaling ratio S may be prepared in advance.

First, the case where the image enlargement process and the image reduction process are not considered, namely the scaling ratio S of 1.0, is described.

Figure 6:
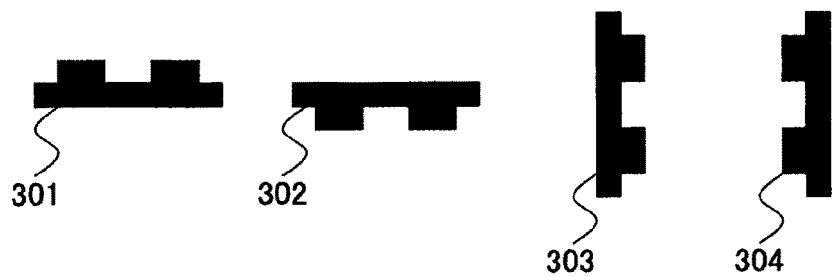
FIG. 6 illustrates a second example of graphic patterns applicable to the electronic watermark embedding method illustrated in FIG. 1.

In this case, graphic patterns 301 thru 304 illustrated in FIG. 6 are prepared as the graphic pattern 113 corresponding to, for example, S=1.0. Then, the graphic pattern 301 or 304 is allocated to the value "1" of the embedment information 112, and the graphic pattern 302 or 303 is allocated to the value "0" of the embedment information 112.

In the example, the two graphic patterns are allocated to one piece of information. However, one graphic pattern may be allocated to one piece of information, or plural graphic patterns may be allocated to plural pieces of information.

Figure 7:
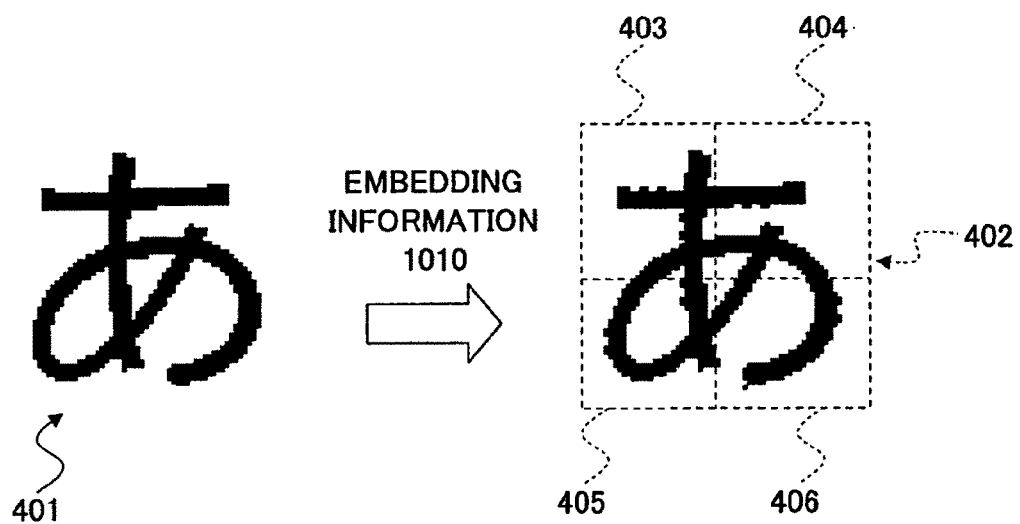
FIG. 7 illustrates an example of an image data embedded with a graphic pattern by the electronic watermark embedding method illustrated in FIG. 1.

FIG. 7 illustrates a case where the information of "1", "0", "1", and "0" are embedded in the image data 401 (111 of FIG. 1) using the correspondence between the graphic pattern and the embedment information.

Referring to FIG. 7, the image data 401 are divided into four rectangular regions (hereinafter, referred to as "embedment region") 403, 404, 405, and 406. The graphic patterns 301 thru 304 illustrated in FIG. 6 are embedded in foregrounds (character itself in FIG. 7) of the embedment regions.

Using a method of embedding the graphic patterns corresponding to the embedment information 112, a value "1" of the embedment information 112 is embedded in the region 403, a value "0" of the embedment information 112 is embedded in the region 404, a value "1" of the embedment information 112 is embedded in the region 405, and a value "0" of the embedment information 112 is embedded in the region 406. By embedding the graphic pattern 113 corresponding to the embedment information 112, the watermarked image data 402 (114) are generated.

Since the two graphic patterns correspond to the one piece of the information as described above, one or both of the two graphic patterns may be used to embed in the embedment regions 403 thru 406.

Figure 10:
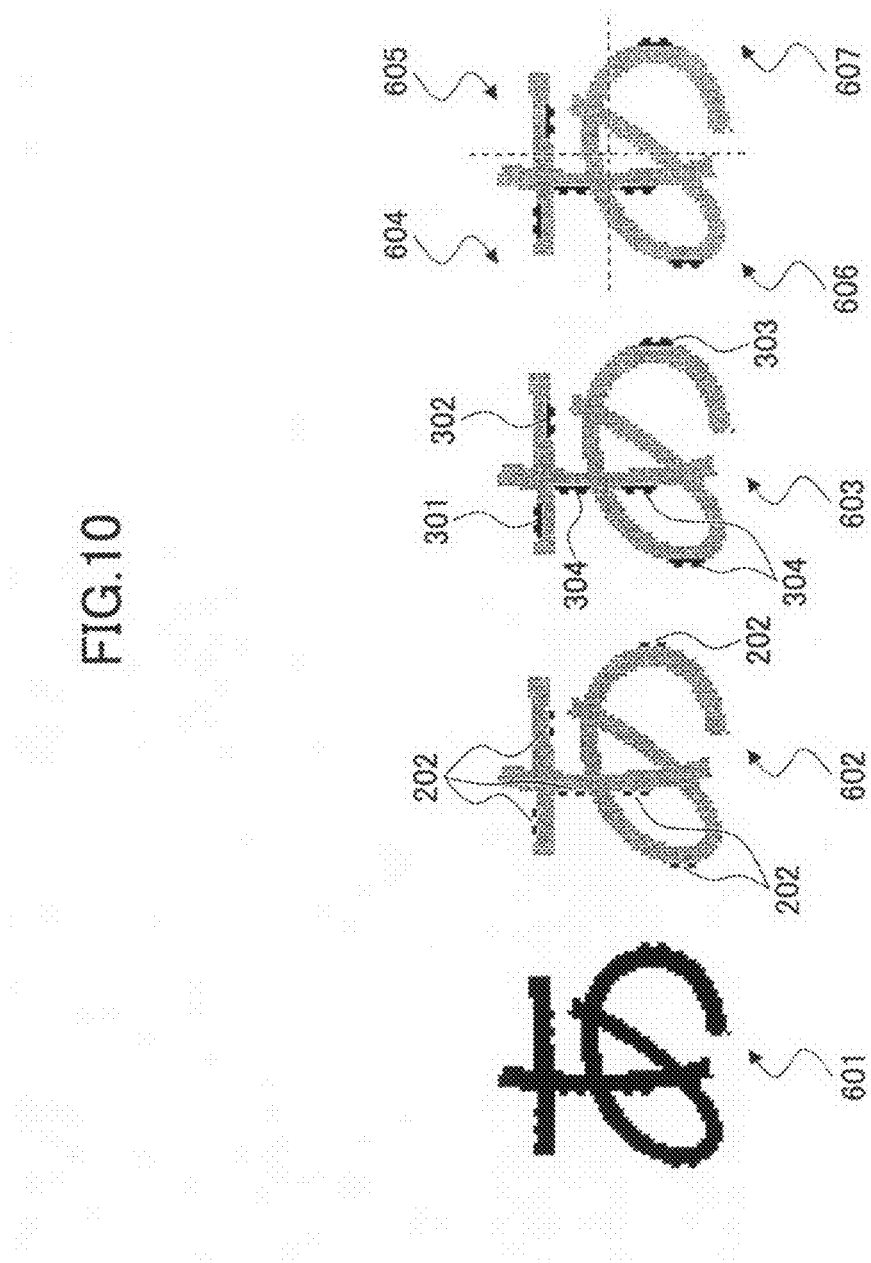
FIG. 10 illustrates a practical example of a process of detecting graphic patterns embedded by the electronic watermark embedding method illustrated in FIG. 1.

Examples of the graphic patterns 301 thru 304 are illustrated in FIG. 10 described below. Since the basic pattern 201 of the graphic pattern 203 is embedded so as to superimpose onto the foreground of the image data, a difference between the image data 401 (111 of FIG. 1) illustrated in FIG. 7 and the watermarked image data 402 (114 of FIG. 1) is resultantly the directional pattern 202 of the graphic pattern 203.

Referring to FIG. 7, the embedment information 112 is embedded in the four rectangular regions of the image data 111. However, the image data may be divided into regions of more than four, and the embedment information 112 may be repeatedly embedded in these regions. When the number of the embedding positions increases, the embedment information 112 is repeatedly embedded in the image data 111. As a result, the graphic patterns 113 corresponding to the embedment information 112 are decentrally arranged in the image data 111.

The graphic patterns 113 embedded by such the electronic watermark embedding method may be detected from the watermarked image data 114 using a non-linear filter and matching of peripheral pixels.

Figure 9:
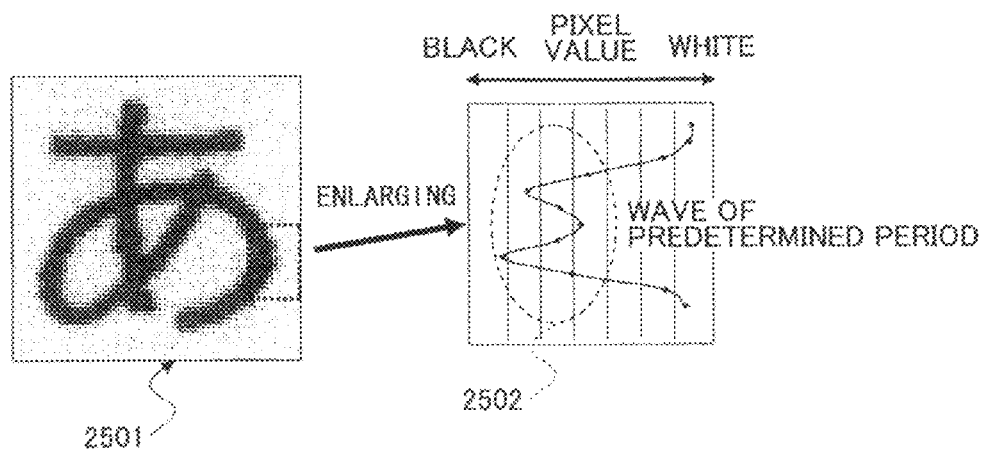
FIG. 9 illustrates a second example of applying a non-linear filter, which is used for detecting a graphic pattern embedded by the electronic watermark embedding method illustrated in FIG. 1, to a directional pattern forming the graphic pattern.

The non-linear filter may be any filter as long as a wave (frequency) of the directional pattern 202 is detectable as illustrated in FIG. 9 described below.

For example, one-dimensional Fourier transform of Formula 2 may be used, where a n-th pixel value (0 thru 255) is designated as x(n) (n=0, 1, ..., N−1).

$$X(k) = \frac{1}{\sqrt{N}} \sum_{n=0}^{N-1} x(n) \cdot e^{-j2\pi k/N}$$ Formula 2

Figure 8:
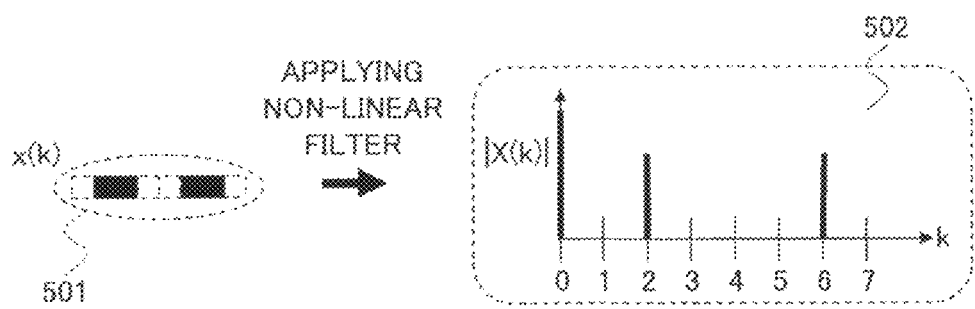
FIG. 8 illustrates a first example of applying a non-linear filter, which is used for detecting a graphic pattern embedded by the electronic watermark embedding method illustrated in FIG. 1, to a directional pattern forming the graphic pattern.

FIG. 8 designates a result obtained by applying the one-dimensional Fourier transform of Formula 1 to the directional pattern 501 (i.e. 202 of FIG. 2) made of pixels of eight dots laterally arranged.

The result of FIG. 8 is obtained based on N=8. Here, a white pixel of the directional pattern 501 is defined as 1, and a black pixel of the directional pattern is defined as 0. The calculation is sequentially done from the leftmost pixel like x(0), x(1), ..., x(7).

In this example, the amplitudes |X(k)| of X(k) is illustrated in a graph 502 with respect to k=0, 1, 2, ..., 7.

Since the directional pattern 202 has a periodic feature, the amplitudes after applying the Fourier transform relative to k=2 and k=6, corresponding to the periodical feature of the directional pattern 202, become large.

In consideration of characteristics of Fourier transform, when N of Formula 2 is fixed, a pattern of the graph 502 does not change.

For example, the image data 2501 of FIG. 9 (i.e. 111 of FIG. 1) are obtained by scanning a printed material with a scanner. Pixel values of a portion where the directional pattern 501 (202 of FIG. 2) of the graphic pattern 113 is embedded in the Image data 2501 demonstrate a wave of a predetermined period corresponding to the periodic feature of the directional pattern, like 2502 illustrated in FIG. 9.

Therefore, by adopting a method of applying the non-linear filter to the watermarked image data 114, searching a region where an amplitude under k>0 corresponding to the periodic feature of the directional pattern 501 (202 of FIG. 2) is larger than a predetermined threshold value, and detecting the region as a directional pattern, the directional pattern 501 (202) is detectable from the watermarked image data 114 with a high probability even though warping or blurring occurs.

The non-linear filter may not always be applied to the entire watermarked image data 114. A process speed may be increased by applying the non-linear filter only to the vicinity of a foreground region of the watermarked image data 114. For example, when the non-linear filter is applied to the image data 601 (i.e. 114 of FIG. 1), a detection result 602 illustrated in FIG. 10 is obtained. In other words, the directional pattern 202 is detected.

Next, the periphery of the detected directional pattern 202 is subjected to a pattern matching processing using the entire graphic pattern 113 (203 of FIG. 2).

Ordinarily, it may not be determined whether the graphic pattern 203 is embedded in a region where the directional pattern 202 is detected. Therefore, the vicinity of the directional pattern 202 undergoes pattern matching processing by using the entire graphic pattern 203. It may be possible to identify the embedded graphic pattern 203 (i.e. 301 thru 304 of FIG. 10) like image data 603 in FIG. 10.

Finally, the obtained image data 603 is divided into predetermined regions 604, 605, 606, and 607, corresponding respectively to the rectangular regions 403 thru 406, and the embedded information 112 is detected based on the type of the graphic pattern 203.

In reference of, for example, a relationship between the embedded information 112 and the graphic pattern 113, values similar to those embedded in the regions in FIG. 7 are detected. Namely, the information "1" is detected from the region 604, the information "0" is detected from the region 605, the information "1" is detected from the region 606, and the information "0" is detected from the region 607.

In this way, by carrying out such the detection process while noting the directional pattern 202 of the graphic pattern 113 decentrally arranged in the watermarked image data 114, the information is detected with a high probability even when a part of the image data 114 is cut away, or an edge becomes thin or blurred.

Next, the case where the image enlargement process or the image reduction process is considered, namely the scaling ratio S is not equal to 1.0, is described.

The embodiment enables to detect the graphic patterns 113 even though the watermarked image data 114 undergo image enlargement processing or an image reduction process occurs on N-up printing or a size change in copying. Specifically, there are provided (A) another graphic pattern 113 generated by changing arrangement of the above graphic pattern, and (B) another graphic pattern 113 generated by altering a vicinity of the signaling feature of the above graphic pattern.

First, a method of generating the other graphic pattern 113 using the above (A) is described.

Figure 11:
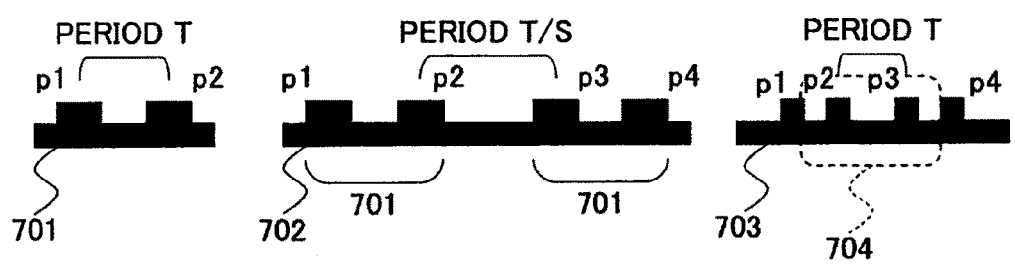
FIG. 11 illustrates a third example of graphic patterns applicable to the electronic watermark embedding method illustrated in FIG. 1.
Figure 12:
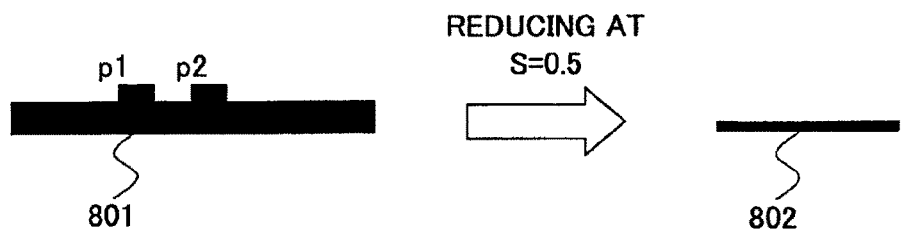
FIG. 12 illustrates a first example of a problem that a directional pattern is lost when an image is reduced.

Referring to FIG. 11, the other graphic pattern 701 (203 of FIG. 2) of (A) basically has a pattern in which pixel values are changed at a predetermined period T, corresponding to an interval between protrusions p1 and p2, which correspond to the directional pattern. When the graphic pattern having such the signaling feature is detected, a filter (e.g. the non-linear filter) reacting with the signaling feature of the period T is applied as illustrated in FIG. 8 and FIG. 9. Thus, the embedded graphic pattern 113 is detected.

Therefore, in the embodiment, the other graphic pattern is generated using plural graphic patterns so as to form a pattern with its pixel values changed at a period of T/S. As a result, even though the watermarked image data 114 are subjected to an image enlargement process or an image reduction process, the other graphic pattern is detectable.

For example, the graphic pattern 702 (113 of FIG. 1) of the embodiment includes the protrusions p1, p2, p3 and p4 formed by arranging two graphic patterns 701 of the same type, having an interval corresponding to the period T. The period T/S is expressed by an interval between p2 and p3.

The interval between the two graphic patterns 701 corresponds to the period T/S as illustrated in FIG. 11. When the graphic pattern 702 (113 of FIG. 1) is embedded in the image data 111 and the image enlargement process or the watermarked image data 114 undergo image reduction processing, the interval between the two graphic patterns 701 corresponds to the period T because T/S is enlarged or reduced at the scaling ratio S so as to be T/S×S=T. Therefore, the graphic pattern 702 (113 of FIG. 1) is detectable from the watermarked image data 114 with the filter for the period T (i.e. the filter for S=1).

When the original graphic pattern 702 is changed as a pattern 703 illustrated in FIG. 11 by the image enlargement process or the image reduction process at the scaling ratio S, the pattern of the period T (T/S×S=T) is resultantly obtainable based on the pattern (p2 and p3 in the graphic pattern 702) of the period T/S. Therefore, the graphic pattern 704 is detectable from the plural patterns without changing setting of a graphic pattern detecting filter.

In this case, when the watermarked image data 114 undergo neither the image enlargement processing nor image reduction processing (i.e. S=1), the graphic pattern 113 may be detected with a process similar to the ordinary process. Said differently, this is because the original pattern 702 includes the graphic patterns 701 having the interval corresponding to the period T, and the graphic pattern 701 is detectable with a filter for the period T.

Although the interval corresponding to the period T/S is expressed by adjusting the interval between the two graphic patterns 701, any method may be used as long as the interval corresponding to the period T/S is expressed.

Next, there is described a method of generating the other graphic pattern (B) by altering neighbor pixels near the signaling feature of the above graphic pattern.

In consideration of visual influence to humans, the number of pixels added to the image data as the directional pattern 202 is preferably several dots. However, the added directional pattern 202 may vanish when the image data undergo image reduction processing at an extremely small scaling ratio.

For example, a graphic pattern 801 (113 of FIG. 1) includes protrusions p1 and p2 having a size of two pixels width and one pixel height (i.e. 2×1 dots) as the directional pattern 202. When the image data undergo image reduction processing at a scaling ratio S=0.5, the added directional pattern 202 vanishes like a pattern 802.

Such vanishment of the directional pattern may occur depending on specific processes of the image reduction process. Provided that the image data undergo image reduction processing at the scaling ration S (0<S<1) is image data D', a pixel value D'(x, y) of the image data D' at the coordinate point (x, y) is obtained by calculating neighbor pixels near the pixel corresponding to the coordinate (x, y) of the image data D, for example.

The pixel value D'(x, y) of the image data D' may be obtained by Formula 3 using neighbor pixels near the coordinate point (x, y) in the image data D.

$$D'(x,y)=D(X,Y)=(1-q)\{(1-p) \cdot D([X],[Y])+p \cdot D([X]+1,[Y])\}+q\{(1-p) \cdot D([X],[Y]+1)+p \cdot D([X]+1,[Y]+1)\} \quad \text{Formula 3}$$

(Where
[A] is the largest integer that does not exceed A.
X=x/S
Y=y/S
p=X−[X]
q=Y−[Y])

Figure 13:
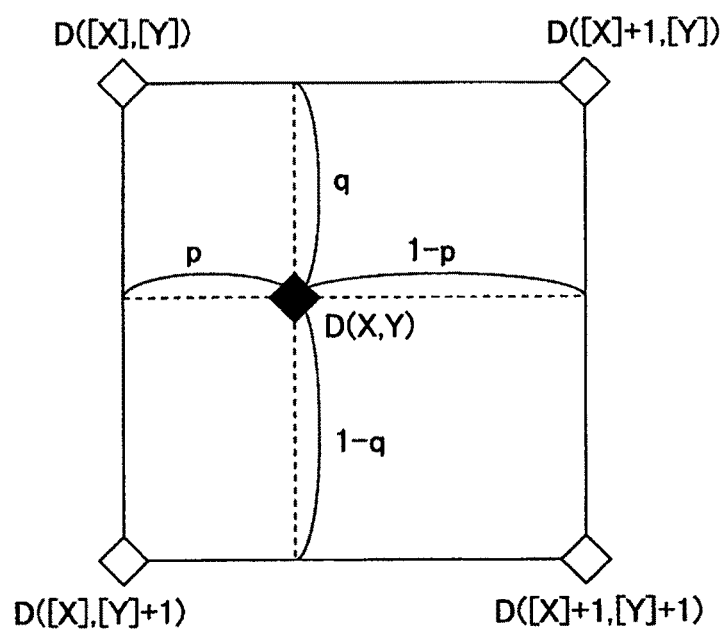
FIG. 13 illustrates a second example of the problem that the directional pattern is lost when the image is reduced.

FIG. 13 illustrates various coordinate points in Formula 3.

When there are not enough pixel values the same as or close to that of a foreground in the neighbor four pixels near the data D corresponding to data D' which undergo image reduction processing, it is known that the added directional pattern may vanish from a calculation result of Formula 3 substituted with these pixel values.

There may be cases where neighbor nine or sixteen pixels are used depending on image reduction methods. However, in such the cases, when there are not enough pixel values the same as or close to that of a foreground in the neighbor pixels near the data D corresponding to data D', which undergo image reduction processing, the added directional pattern 202 may vanish.

In the embodiment, in order to prevent the added directional pattern from vanishing when the image data undergo image reduction processing, the dot number of dots forming the protrusions of the added directional pattern 202 is changed. Typically, the dot number is increased as described below.

For example, the prevention of the vanishment of the directional pattern in the image reduction process after the image data undergo image reduction processing by Formula 3 is typically practiced with a high probability such that the dot number of the protrusions forming a directional pattern 202 included in a graphic pattern 801 (203 of FIG. 1) are changed from an original 2 dots (2×1 dot=2 dots) to 4 dots (2×2 dot=4 dots) in case of the image reduction process at the scaling ratio S=0.5.

As a result, the directional pattern becomes 1×1 dot because 2×2 dots multiplied by 0.5 equal to 1×1 dot. Thus, the directional pattern is maintained without vanishing in the case of the image reduction process at S=0.5.

Figure 14A:
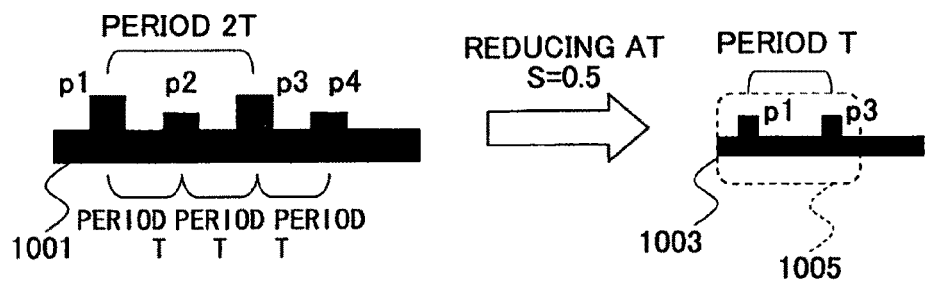
FIG. 14A illustrates an example of altering neighbor pixels near a portion related to a signaling feature of a graphic pattern, as a structural example of the graphic pattern applicable to the electronic watermark embedding method illustrated in FIG. 1.
Figure 14B:
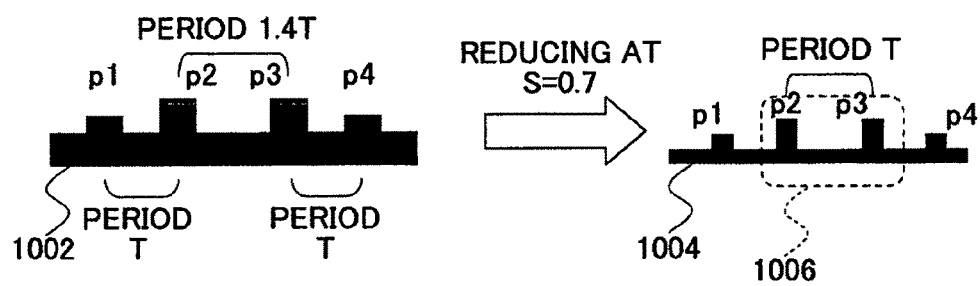
FIG. 14B illustrates an example of altering neighbor pixels near a portion related to a signaling feature of a graphic pattern, as a structural example of the graphic pattern applicable to the electronic watermark embedding method illustrated in FIG. 1.

FIG. 14A and FIG. 14B illustrate examples of this method.

FIG. 14A illustrates one or both of a graphic pattern generated by changing arrangement of graphic patterns and a graphic pattern generated by altering neighbor pixels near a signaling feature in case of a scaling ratio S=0.5. FIG. 14B illustrates one or both of those in case of a scaling ratio S=0.7.

In the example of FIG. 14A, the protrusions p1, p2, p3 and p4 are arranged at an interval corresponding to period T. The dot numbers of the every other protrusions p1, p3 are increased.

The arrangement of the graphic pattern is changed by increasing the protrusions forming the directional pattern 202 from the original four dots width to two dots height.

By changing the protrusions forming the directional pattern from the four dots width to the two dots height, not only the original period T but also the period 2T obtained from the interval of the every other protrusion is obtainable based on the intervals of the protrusions. Namely, the period of the signaling feature of the graphic pattern is changed, and a period 2T different from the original period T is further indicated.

Further, the protrusions of the directional pattern, i.e. signaling feature of the graphic pattern, originally arranged in 2×1 dots (i.e. 2 pixels width and 1 pixel height as in 203 of FIG. 2) are altered so that pixels (i.e. neighbor pixels) immediately above the two pixels in the width direction are changed to, for example, black pixels and included in the directional pattern. As a result, the dot numbers of the protrusions p1 and p3 are increased to be 2×2 dots (2 pixels width and 2 pixels height) as described above. As described above, the neighbor pixels may be altered.

As a result, when the image data undergo image reduction processing, the protrusions p1 and p3 with these dot numbers increased may be maintained even though the protrusions p2 and p4 without these dot numbers increased vanish, as illustrated in the right side of FIG. 14A.

Further, the protrusions p1 and p3 have the intervals corresponding to the period 2T of the every other pixel. Therefore, when the image data undergo image reduction processing at the scaling ratio of 0.5, a pattern 1005 having an interval corresponding to a period T (2T×0.5=T) is resultantly obtainable.

In case of a graphic pattern 1002 of FIG. 14B, the arrangement of a graphic pattern is changed in a manner similar to the case of FIG. 14A, and neighbor pixels near a signaling feature of the graphic pattern is changed. Thus, the period T of the signaling feature of the graphic pattern is changed to generate a pattern having a different period of 1.4T.

Said differently, in the graphic pattern 1002, a set of the protrusions p1 and p2 and a set of the protrusions p3 and p4 are arranged at the interval corresponding to the period T, and the set of the protrusions p1 and p2 and the set of the protrusions p3 and p4 are arranged to have an interval corresponding to the period 1.4T. The interval corresponding to the period between the inner two protrusions p2 and p3 is 1.4T as illustrated in FIG. 14B. The dot numbers and the lengths of the inner two protrusions p2 and p3 are increased. By altering the back ground to include dots immediately above the protrusions as the black pixels in the two protrusions p2 and p3 in a manner similar to the alteration of the protrusions p1 and p3 illustrated in FIG. 14A, the dot numbers of the protrusions p2 and p3 become 2×2 dots=4 dots from 2×1 dots=2 dots, i.e. the protrusion change from 1 dot long to 2 dots long. Said differently, by changing the neighbor pixels near the signaling feature of the graphic pattern, the pattern having the period 1.4 different from the original period T is generated.

In this way, since the protrusions p2 and p3 are arranged at the interval corresponding to the period 1.4T, when the image data undergo image reduction processing at a scaling ratio of 0.7, the period 1.4T is reduced like 1.4T×0.7≈1T. Resultantly, the interval corresponds substantially to the period T as 1006 illustrated in FIG. 14B.

When the graphic pattern 1001 or the graphic pattern 1002 are generated by changing the arrangement of the graphic pattern and altering the neighbor pixels near the signaling feature, the patterns substantially having the period of T are obtainable in the pattern 1003 after the 50% image reduction process (S=0.5) or the 70% image reduction process (S=0.7).

Therefore, a periodical signal the same as that before the image reduction process is detectable in either case. The graphic pattern 1005 or 1006 may be detected by a detection process similar to an ordinary detection process.

In the examples of FIG. 14A and FIG. 14B, the dot numbers of the black pixels (the protrusions p1 and p3 of FIG. 14A, and p2 and p3 of FIG. 14B) are increased to alter the neighbor pixels near the signaling feature. However, the embodiment is not limited to these examples, and dot numbers of white pixels may be increased.

Meanwhile, the scaling ratio S may not be limited to 0.5 or 0.7. A graphic pattern 113 having a period which is set to image data 111 in consideration of plural scaling ratios S may be generated.

Figure 15:
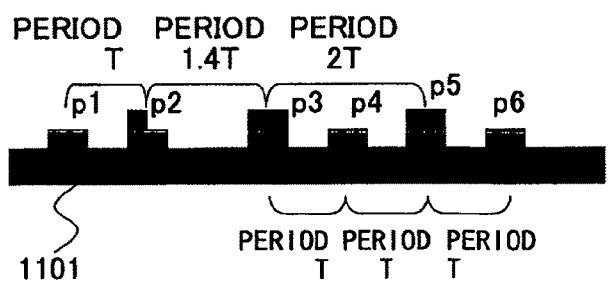
FIG. 15 illustrates an example of altering, in response to several types of image reduction, neighbor pixels near a portion related to a signaling feature of a graphic pattern, as a structural example of the graphic pattern applicable to the electronic watermark embedding method illustrated in FIG. 1.

Such the graphic pattern may be used for not only the ordinary detection process at the scaling ratio of S=1.0 but also detection processes at the scaling ratios of S=0.5 and S=0.7, like a pattern 1101 illustrated in FIG. 15.

Referring to FIG. 15, protrusions p1, p2, p3, p4, p5, and p6 are arranged to have periods T, 1.4T, T, T, T, and T, respectively. The length of the protrusion p2 in the second place is partly increased such that the length of the front half (½) of the width thereof is increased. The lengths of the protrusions p3 and p5 in the third and fifth places are increased in their entire widths.

As a result, the intervals among the three protrusions p2, p3 and p5 with their lengths increased are 1.4T and 2T as illustrated in FIG. 15. Therefore, when the graphic pattern 1101 undergoes image reduction processing at a scaling ratio S of 0.5, the interval between the protrusions p3 and p5 becomes 2T×0.5=T pixels to enable obtaining the period T from the protrusions p3 and p5, in a manner similar to FIG. 14A.

When the graphic pattern 1101 undergoes image reduction processing at a scaling ratio S of 0.7, the interval between the protrusions p2 and p3 becomes 1.4T×0.7≈T pixels to enable obtaining the period T from the protrusions p2 and p3.

When the graphic pattern undergoes neither the image enlargement processing nor the image reduction processing, since the intervals between the protrusions p1 and p2, between the protrusions p3 and p4, between the protrusions p4 and p5, and between the protrusions p5 and p6 correspond to the periods T, the periods T may be detected.

At the time of detecting the graphic patterns, there is no great change in the output illustrated in FIG. 8 with, for example, the non-linear filter using Fourier transform in reference to FIG. 8 and Formula 1 because of characteristics of Fourier transform.

Therefore, even when an image enlargement or reduction process at scaling ratios including allowance errors A, B and C is provided to watermarked image data 114, in which the graphic pattern 1101 illustrated in FIG. 15 are embedded, the graphic patterns 1101 may be detected without changing a coefficient related to a detection period T of a detection filter (i.e. the above non-liner filter). For example, the graphic pattern 1101 is detectable not only exactly at scaling ratios S=1.0, 0.7 and 0.5 but also at scaling ratios S=1.0±A, 0.7±A and 0.5±A, where A, B and C are arbitrarily set by the threshold value of the filter.

It is not always necessary to configure the graphic pattern 1101 usable for all the plural scaling ratios S=1.0, 0.7 and 0.5 as illustrated in FIG. 15. Graphic patterns usable respectively for the scaling ratios S=1.0, 0.7 and 0.5 may be individually generated and randomly selected so as to be embedded in graphic patterns 113 which correspond to the scaling ratios.

Figure 16A:
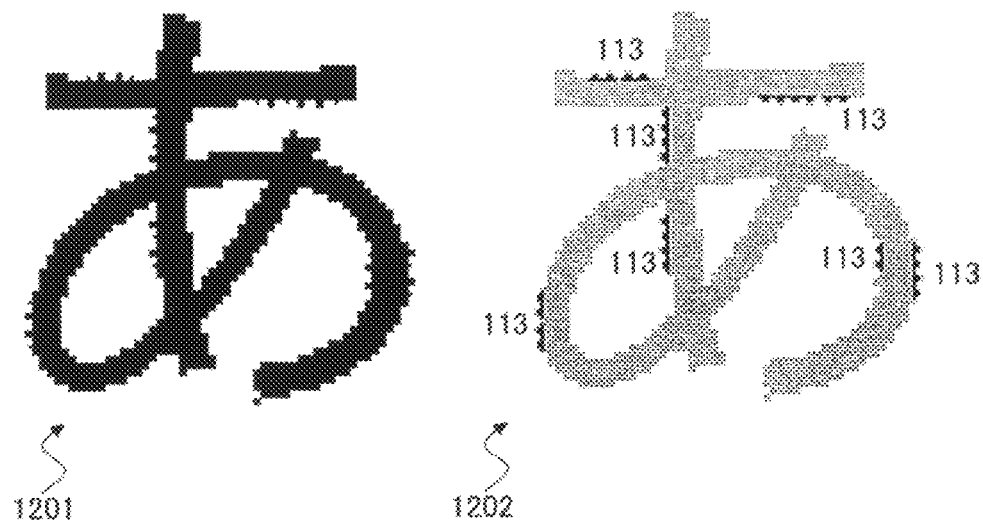
FIG. 16A, FIG. 16B and FIG. 16C illustrate examples of embedment and detection of information applicable to the electronic watermark embedding method illustrated in FIG. 1 when graphic patterns are randomly selected and embedded in image data.

Embedded with image data 1201 illustrated in FIG. 16A (111 of FIG. 1) is graphic patterns 113 for a case where the image data do not undergo image enlargement or reduction processing at a scaling ratio S=1.0 and for an image reduction process at scaling ratios S=0.7 and 0.5. The graphic patterns 113 are randomly selected and embedded in the image data.

Figure 17A:
FIG. 17A and FIG. 17B illustrate examples of graphic patterns applicable to the electronic watermark embedding method illustrated in FIG. 1 at scaling ratios respectively of S=0.7 and S=0.5.
Figure 17B:

When embedding in the image data 1201 illustrated in FIG. 16A, graphic patterns 1301 and 1302 respectively corresponding to the scaling ratios S=0.7 and 0.5 illustrated in FIG. 17A and FIG. 17B are used as the graphic patterns 113. The graphic patterns 1301 and 1302, respectively similar to the graphic patterns of FIG. 14B and FIG. 14A, are rotated in a manner 301, 302, 303 and 304 illustrated in FIG. 6 before being embedded in the image data 1202.

FIG. 16A illustrates the image data 1202 and graphic patterns 113 to be detected from watermarked image data 114 in case of a scaling ratio S=1.0.

Figure 16B:
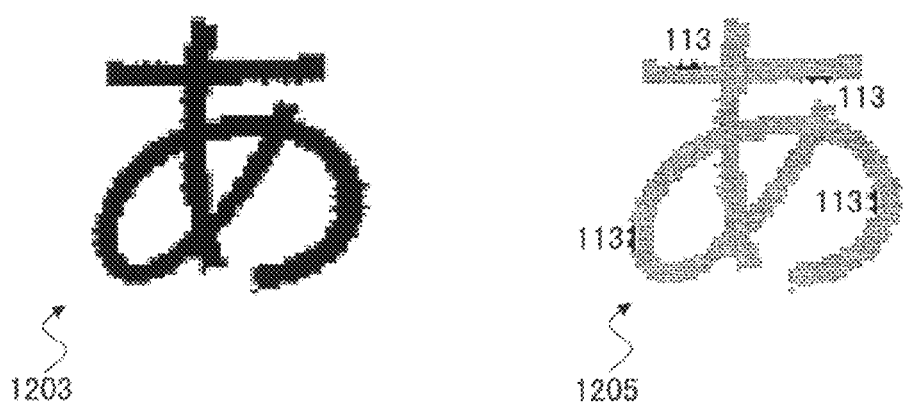
Figure 16C:

FIG. 16B and FIG. 16C illustrate examples of image data 1203 and 1204 of watermarked image data 114. The image data 1203 and 1204 undergo image reduction processing using a linear interpolation method by Formula 3 respectively at S=0.7 and S=0.5.

In any case of the image data undergo image reduction processing, the directional pattern 202 of FIG. 2 does not completely vanish and is at least partly left as illustrated in FIG. 14A. Therefore, the graphic patterns 113 are detectable like detection results 1205 and 1206 illustrated in FIG. 16B and FIG. 16C.

N-up printing or scaling change in copying is standardized in many cases. Therefore, the scaling ratio S may be speculated to some extent. By generating plural types of the graphic patterns 113 included in signaling features of discrete periods in conformity with the speculated image enlargement or reduction process and embedding the generated plural graphic patterns in one of image data 111, the graphic patterns 113 may be further effectively detectable.

Figure 18A:
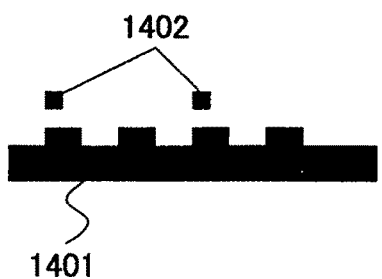
FIG. 18A illustrates an example of altering neighbor pixels near a portion related to a signaling feature of a graphic pattern, as a structural example of the graphic pattern applicable to the electronic watermark embedding method illustrated in FIG. 1.

The neighbor pixels near the signaling feature of the graphic pattern 113 may be isolated points 1402 relative to a graphic pattern 1401 (113 of FIG. 18A) as illustrated in FIG. 18A. However, in order to prevent this alternation of the neighbor pixels by adding the isolated points from being perceived by persons in this case, the position of the isolated points may be limited to a region near a foreground.

Figure 18B:
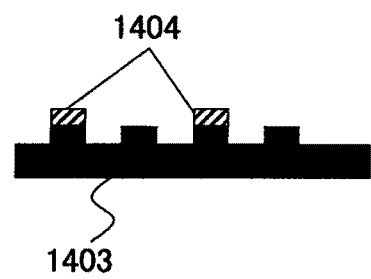
FIG. 18B illustrates an example of altering neighbor pixels near a portion related to a signaling feature of a graphic pattern, as a structural example of the graphic pattern applicable to the electronic watermark embedding method illustrated in FIG. 1.

Further, when the image data 111 are color, the graphic pattern 113 may be generated so that the pixel value of a pixel immediately above the directional pattern 202 differs from the pixel value of the directional pattern 202 like a pixel 1404 on a graphic pattern 1403 in FIG. 18B.

Figure 19:
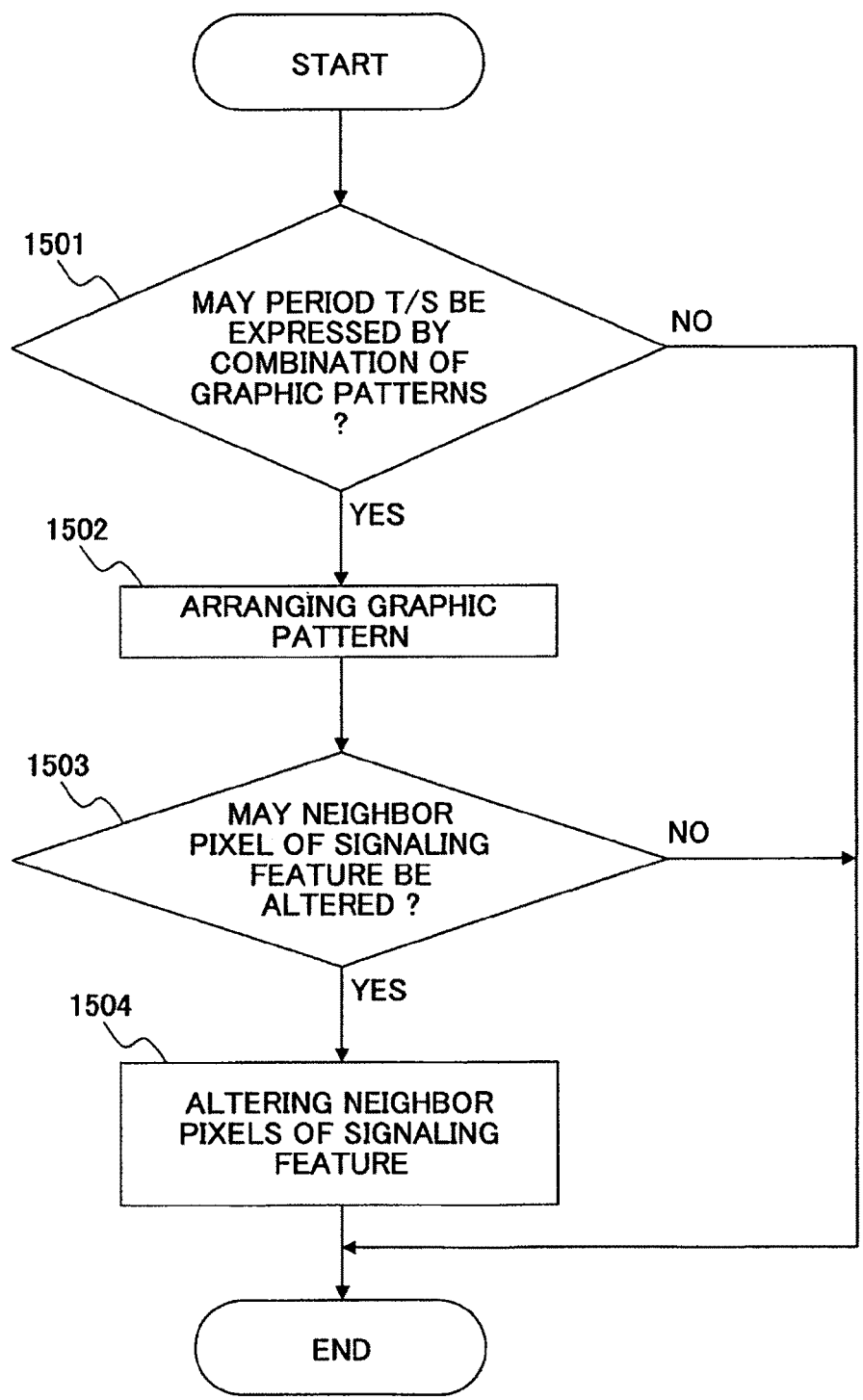
FIG. 19 is a flowchart illustrating a graphic pattern arrangement and an example of altering neighbor pixels near a portion related to a signaling feature of a graphic pattern in the electronic watermark embedding method illustrated in FIG. 1.

FIG. 19 is a flowchart illustrating generation of the new graphic pattern 113 by (A) changing the arrangement of the graphic pattern and (B) altering the neighbor pixels near the signaling feature of the graphic pattern.

Referring to FIG. 19, it is checked whether combination of the graphic patterns enables to express a period T/S in Step 1501.

If the period T/S is expressed by the combination (YES in Step 1501), the graphic patterns are arranged to express the period T/S in Step 1502.

When the two dimensional matrix 2201 having a size of 8×3 (8 dots width and 3 dots height) illustrated in FIG. 3 is used and the speculated scaling ratio is S=0.5, an explanation is given of generation of the graphic pattern 1001 in FIG. 14A.

Figures 20, 21:
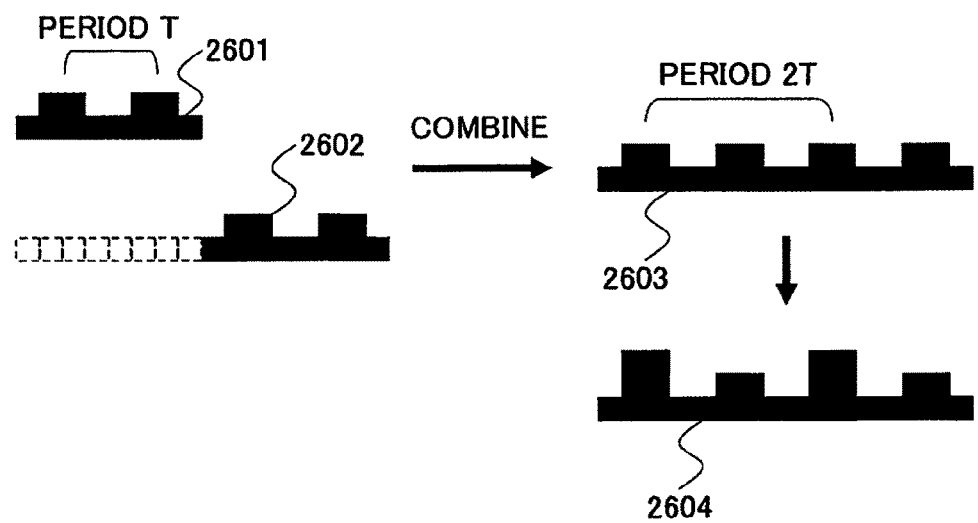
FIG. 20 is a first view illustrating a graphic pattern arrangement and a flow of altering neighbor pixels near a portion related to a signaling feature of a graphic pattern illustrated in FIG. 19.
FIG. 21 is a second view illustrating a graphic pattern arrangement and a flow of altering neighbor pixels near a portion related to a signaling feature of a graphic pattern illustrated in FIG. 19.

As illustrated in FIG. 20, a graphic pattern 2603 having an interval corresponding to a period 2T may be generated by combining the graphic pattern 2601 (203 of FIG. 3) with a graphic pattern 2602 obtained by laterally shifting the graphic pattern 2601 by 8 dots.

Next, in case of YES in Step 1503 illustrated in FIG. 19 where the neighbor pixels near the signaling feature of the graphic pattern may be altered, the neighbor pixels are altered and the new graphic pattern is generated in Step 1504.

For example, the portion "x" of "don't care" illustrated in the two-dimensional 2201 may be changed as a changeable pixel. Referring to FIG. 21, the second, third, tenth and eleventh pixels in the first row are changed from "x" to "a". The graphic pattern 2604 in FIG. 20 (similar to the graphic pattern 1001 in FIG. 14A) is generated as the two-dimensional matrix 2701 illustrated in, for example, FIG. 21. The graphic pattern 2604 generated as described may be generated every time the information is embedded or previously generated and stored as a graphic pattern.

In this way, when the image data undergo image reduction processing by generating a new graphic pattern with an arrangement change of a graphic pattern or alteration of neighbor pixels near a signaling feature of a graphic pattern 113 at a time of embedment, the graphic pattern is detected from watermarked data 114 and watermark information 112 corresponding to the graphic pattern 113 may be determined without changing setting of a coefficient such as a coefficient related to a detection period of the non-linear filter.

When the detection is done, a scaling ratio S at which the watermarked image data 114 of an image undergo enlargement or reduction processing is calculated from the detected graphic pattern 113. The graphic pattern 113 may be detected again after parameters are set again in association with the calculated scaling ratio S. The process of setting the parameter again in association with the scaling ratio is described later with reference to FIG. 28.

Next, specific structure and operation of the electronic watermark embedding method using the graphic patterns described in the embodiment are described.

Figure 22:
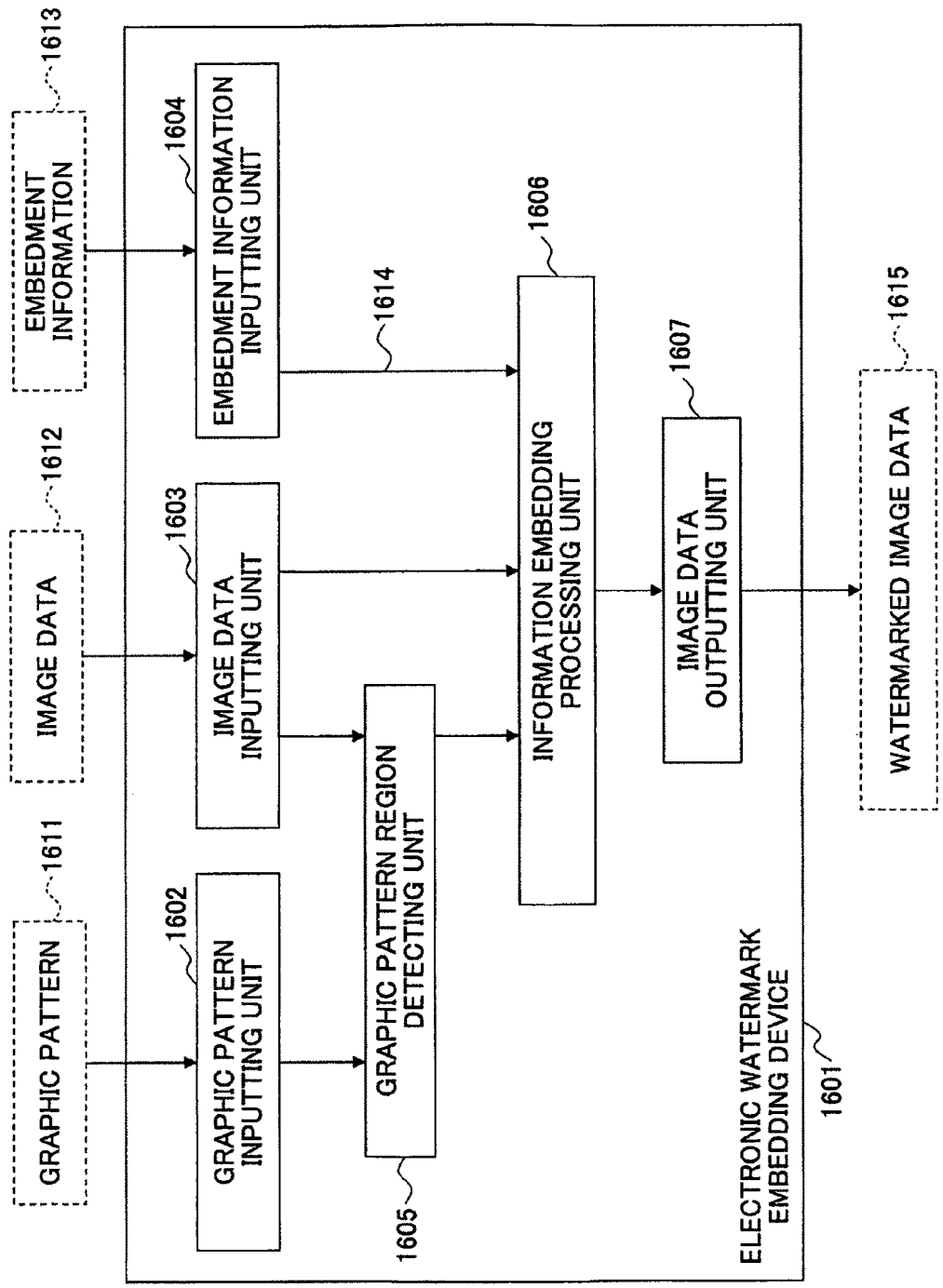
FIG. 22 is a functional block chart explaining an entire structure of an electronic watermark embedding device for practicing the electronic watermark embedding method illustrated in FIG. 1.

FIG. 22 illustrates the structure of an electronic watermark embedding device which performs the above electronic watermark embedding method. The electronic watermark embedding device 1601 includes a graphic pattern inputting unit 1602, an image data inputting unit 1603, an embedment information inputting unit 1604, a graphic pattern region detecting unit 1605, an information embedding processing unit 1606, and an image data outputting unit 1607.

The graphic pattern inputting unit 1602 receives an input graphic pattern 1611 (113 of FIG. 1). The image data inputting unit 1603 receives an input image data 1612 (111 of FIG. 1). The embedment information inputting unit 1604 receives input embedment information 1613 (112 of FIG. 1).

Figure 23:
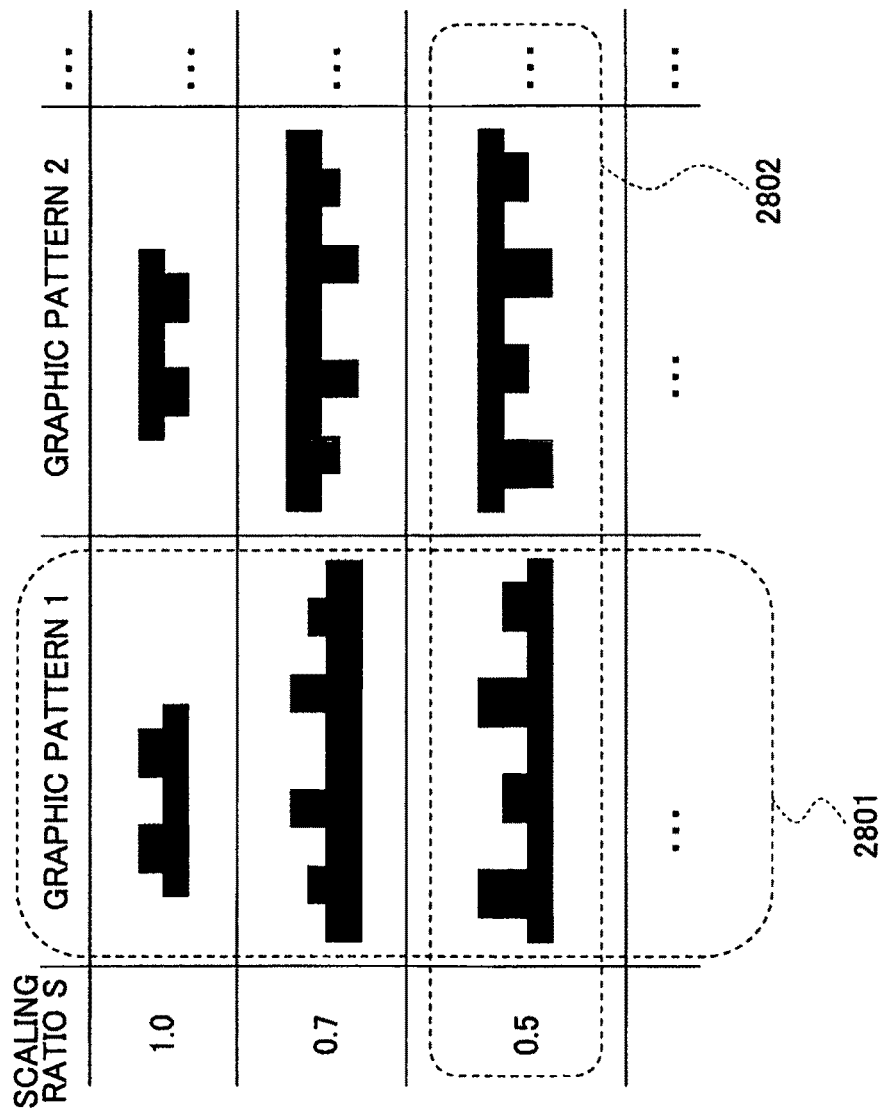
FIG. 23 illustrates a function of the electronic watermark embedding device illustrated in FIG. 22.

The graphic pattern inputting unit 1602 obtains the information of the graphic pattern 1611 in the form of the two-dimensional matrix 2201, for example, as illustrated in FIG. 3. As illustrated in FIG. 23, plural graphic patterns 113 corresponding to the shapes and the scaling ratios of the graphic patterns may be generated, and the generated graphic patterns 113 may be inputted into the graphic pattern inputting unit 1602.

Referring to FIG. 23, graphic patterns 1 and 2 of the uppermost row, i.e. the scaling ratio of S=1, correspond to the graphic patterns 301 and 302 illustrated in FIG. 3. Graphic patterns 1 and 2 of the middle row, i.e. the scaling ratio of S=0.7, correspond to the graphic pattern 1002 illustrated in FIG. 14B. Graphic patterns 1 and 2 of the lowermost row, i.e. the scaling ratio of S=0.5, correspond to the graphic pattern 1001 illustrated in FIG. 14A.

The embedment information inputting unit 1604 outputs embedment information 1613 to the information embedding processing unit 1606 as the watermark information 1614.

The watermark information 1614 is a bit string expressed by logic "0" or "1". On the other hand, the embedment information 1613 may be a character string or a number as long as the embedment information 1613 may be expressed in the form of the bit string. For example, when the embedment information 1613 is an English text, the embedment information inputting unit 1604 converts a text inside the embedment information 1613 into an ASCII (Registered Mark) code and outputs it as the watermark information 1614.

The watermark information 1614 may be generated by giving an error correction signal to the embedment information 1613 in order to improve a detection accuracy of the embedment information 1613 from the watermarked image data 1615 (114 of FIG. 1), in which the embedment information 1613 is embedded. For example, when the information of 63 bits, configured by adding a hamming code of 6 bits to information of 57 bits, is used as the watermark information 1614, it is possible to correct a bit error of one bit included in the watermark information 1614.

The image data inputting unit 1603 outputs the image data 1612 to the graphic pattern region detecting unit 1605 and the information embedding processing unit 1606. The graphic pattern inputting unit 1602 outputs the information of the graphic pattern 1611 to the graphic pattern region detecting unit 1605.

The graphic pattern region detecting unit 1605 detects embedding positions in which the graphic pattern 1611 may be embedded from the image data 1612. The embedding positions of the image data in which the graphic pattern 1611 may be embedded are detected as described in reference to FIG. 4.

The information embedding processing unit 1606 selects a graphic pattern to be embedded based on the watermark information 1614 and the scaling ratio S of the image data 1612 using the image data 1612, a processing result with the graphic pattern region detecting unit 1605, and the watermark information 1614.

When the scaling ratio is previously set, a graphic pattern may be selected from the corresponding watermark information 1614 and scaling ratio. However, when the scaling ratio is not previously set, the graphic pattern may be randomly selected from plural graphic patterns (e.g. FIG. 23) corresponding to the scaling ratios and the watermark information 1614.

For example, a column element 2801 in FIG. 23 illustrates graphic patterns of the watermark information respectively corresponding to various values (scaling ratios) of the watermark information. The row element 2802 illustrates graphic patterns respectively corresponding to the scaling ratios of the image data 1612.

The information embedding processing unit 1606 outputs the generated watermarked image data 1615 having the watermark information to the image data outputting unit 1607. The image data outputting unit 1607 outputs the generated watermarked image data 1615 having the embedded watermark information 1614.

The watermarked image data 1615 having the watermark information may be printed out by a printer or the like or stored as an electronic data as is.

Figure 24:
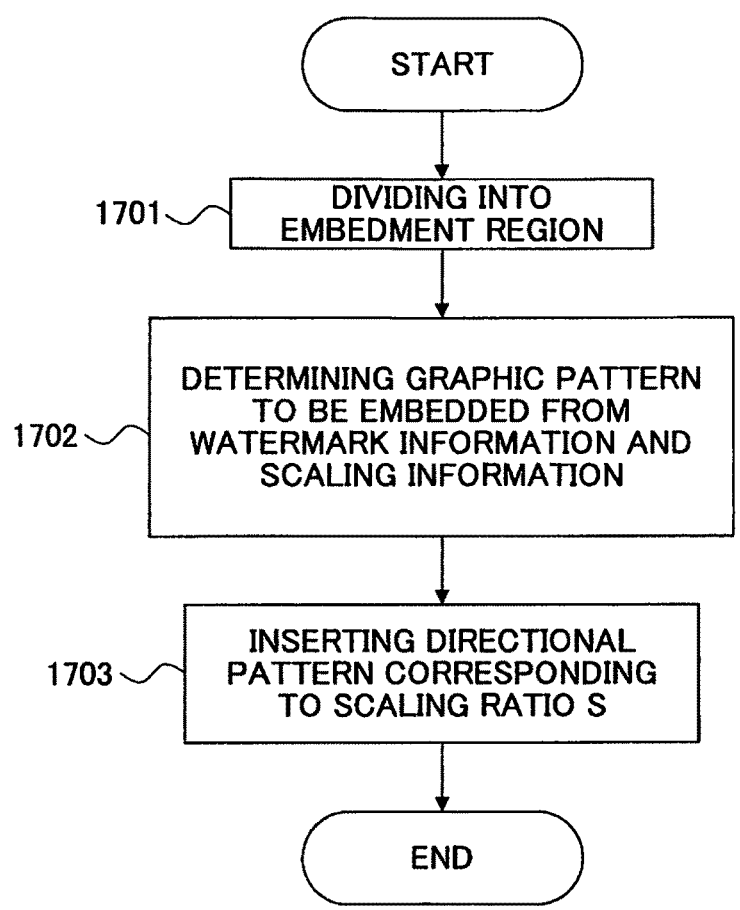
FIG. 24 is a flowchart illustrating an embedding process of a graphic pattern with an information embedding processing unit of the electronic watermark embedding device illustrated in FIG. 22.

FIG. 24 is a flowchart illustrating processes carried out by the information embedding processing unit 1606.

In Step 1701, the entire image data 1612 or a part of the image data 1612 is divided into embedment regions for embedding the watermark information 1614. For example, the image data are divided into the embedment regions 403 thru 406 in FIG. 7 and the embedment regions 604 thru 607 in FIG. 10.

Figure 26A:
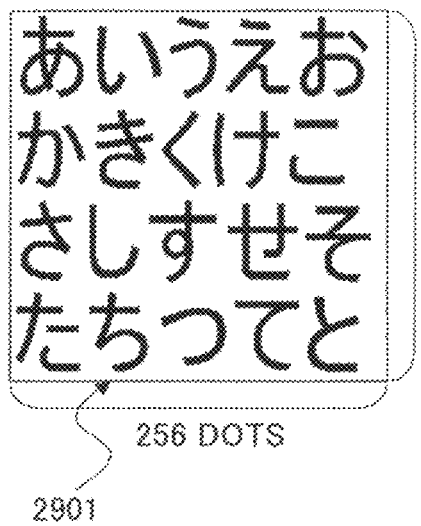
FIG. 26A, FIG. 26B, FIG. 26C, and FIG. 26D illustrate a second example of an embedment region in which a graphic pattern is embedded by an embedding process of the graphic pattern with the information embedding processing unit illustrated in FIG. 24.

Referring to FIG. 26A as an example, entire image data 2902 is divided into the embedment regions.

The embedment region is, for example, a rectangular region having a size of m×n (m dots width and n dots height, where m and n are natural numbers). The size of the embedment region is preferably the size of the graphic pattern 1611 or more.

Figure 25:
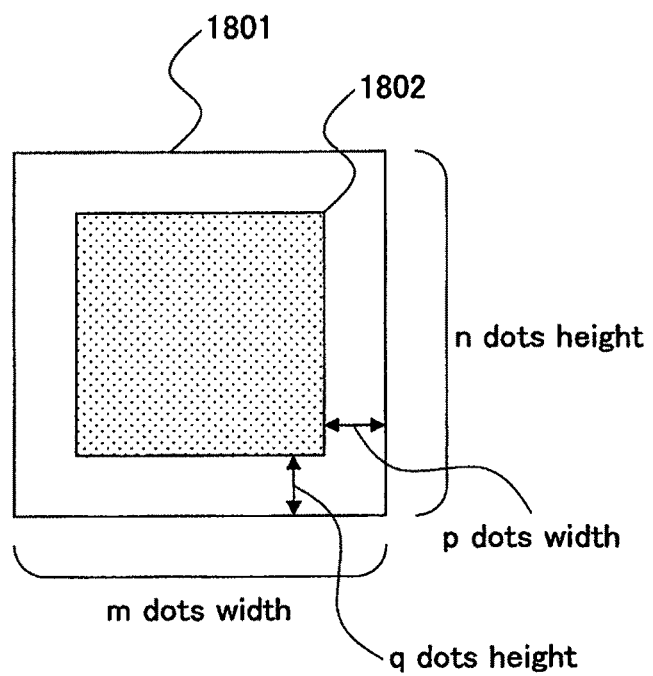
FIG. 25 illustrates a first example of an embedment region in which a graphic pattern is embedded by an embedding process of the graphic pattern with the information embedding processing unit illustrated in FIG. 24.

Further, a space where the graphic pattern is not embedded is provided in the embedment region so that the boundary of the embedment region is detectable. Referring to FIG. 25 as an example, the embedment region 1801 is provided with a blank region having a size of p dots width and q dots height and without having any graphic pattern 1611 embedded therein. In this case, a region where the graphic pattern 1611 is actually embedded is a region 1802 inside the embedment region 1801.

Figure 26B:
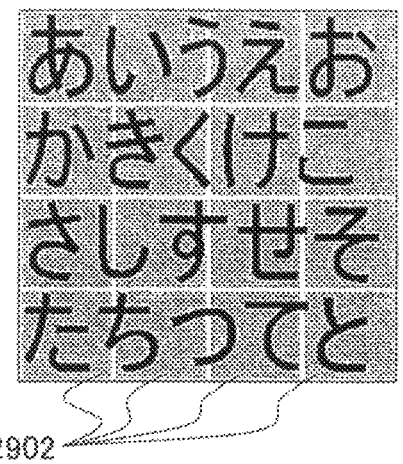

FIG. 26B is an example that image data 2901 of 256 dots width and 256 dots height is divided into rectangular regions of m=n=64 and p=q=2 and the region where the graphic pattern is embedded is indicated by gray regions 2902.

Referring back to FIG. 24, a graphic pattern 1611 to be embedded in the embedment region is determined in correspondence with the watermark information 1614 and the scaling ratio in Step 1702.

When plural embedding positions are detected by the graphic pattern region detecting unit 1605 in one of the embedment regions, one or more of the graphic patterns 1611 may be embedded within the number of the plural embedding positions. Further, it is possible to use one type of the graphic patterns 1611 in correspondence with one type of the watermark information, or a combination of several types of the graphic patterns 1611.

Next, the graphic patterns 1611 are embedded in the embedding positions output from the graphic pattern region detecting unit 1605 in Step 1703.

For example, FIG. 26 illustrates an example of setting the scaling ratio S=0.7 and sequentially embedding watermark information "1", "1", "0" and "1" in the rectangular regions 2902 (i.e. embedment regions) of the image data in a manner similar to that illustrated in FIG. 7.

Figure 26C:
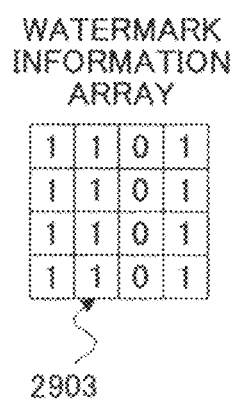
Figure 26D:
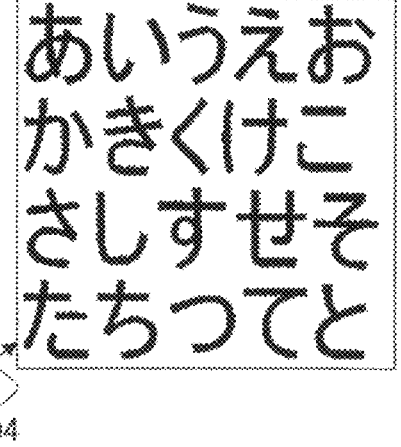

The image data 2904 are formed as illustrated in FIG. 26D by embedding the graphic pattern 1611 corresponding to watermark information array 2903 formed by sequentially arranging the watermark information "1", "1", "0" and "1" as illustrated in FIG. 26C.

Referring to FIG. 26A, FIG. 26B, FIG. 26C and FIG. 26D, the image data 2901 is divided into the embedment regions 2902, and information (1/0) of matrix elements corresponding to the watermark information array 2903 is allocated to the embedment regions 2902.

For example, four elements of the extreme left column of the watermark information array 2903, namely "1", "1", "1", and "1" in the vertical downward direction are allocated to the four embedment regions 2902 in the extreme left column in the vertical downward direction, which includes Japanese characters "あ", "か", "さ", and "た" of the image data 2901.

In a manner similar thereto, the four embedment regions 2902 arranged along the uppermost row in the horizontal direction of the watermark information array 2903, namely "1", "1", "0", and "1", are allocated to the four embedment regions 2902 arranged along the uppermost row in the horizontal direction of the embedment regions 2902, mainly including Japanese characters "あ", "い", "え", and "お" of the image data 2901.

In a manner similar to FIG. 7 and FIG. 10, the graphic patterns 301 and 304 are allocated to the embedment regions 2902 having "1" allocated to these in conformity with to a relationship between the graphic pattern described in reference of FIG. 6 and the embedment information.

The graphic pattern region detecting unit 1605 of FIG. 22 may detect the embedding positions by plural times with respect to plural types of graphic patterns 1611 input as described above. However, when a combination of the embedment region and the graphic pattern 1611 corresponding to the graphic pattern is already determined, it is possible to detect the embedding positions where the graphic pattern may be embedded using only the graphic pattern 1611 corresponding to the value of the watermark information. For example, when the number of the graphic patterns is N and the number of the types of the graphic patterns corresponding to the one watermark information is M (smaller than N), it is sufficient to detect the embedding positions of the graphic patterns of M types. Therefore, the number of detecting times becomes M/N to enable high speed processing.

Next, described below is a detailed structure and operations of an electronic watermark detecting device for processing the electronic watermark detecting method of detecting the information (embedment information or watermark information) 1613, which is embedded from the watermarked image data 1615.

FIG. 27 illustrates an example of the structure of the electronic watermark detecting device 190.

The electronic watermark detecting device 1901 includes an image data inputting unit 1902, a graphic pattern inputting unit 1903, a graphic pattern detecting unit 1904, an information detection processing unit 1905, and an information outputting unit 1906.

Next, there is described about a case where embedment information 1914 (1613) is detected from watermarked image data 1911 obtained by reading a printed material of the watermarked image data 1615 by a scanner. However, in addition to the above method, the watermarked image data 1615 of FIG. 22 may be input as the watermark image data 1911.

First, the image data 1911 are input in the image data inputting unit 1902. Simultaneously, the graphic pattern 1912 is input in the graphic pattern inputting unit 1903. A graphic pattern 1912 similar to the graphic pattern 1611 input in the electronic watermark embedding device 1601 is input in the graphic pattern inputting unit 1903. The input watermarked image data 1911 and graphic pattern 1912 are sent to the graphic pattern detecting unit 1904.

The graphic pattern detecting unit 1904 detects a position where the graphic pattern 1912 is embedded from the watermarked image data 1911. Further, the information detection processing unit 1905 determines the embedded watermark information for the result of the detection with the graphic pattern detecting unit 1904. The watermark information may be determined in a way of majority voting (described below) after obtaining types of the graphic patterns 1912 and calculating the number of the graphic patterns 1912 based on all embedment regions in which identical information pieces are embedded.

FIG. 28 is a flowchart illustrating processes of detecting the watermark information from the detected graphic pattern in the information detection processing unit 1905.

In Step 2001, the information detection processing unit 1905 determines a boundary of an embedment region based on information of the detected graphic pattern 1912.

Simultaneously in Step 2001, a scaling ratio S at which original image data 1615 of FIG. 22 undergo image enlargement or reduction processing is calculated from the size of the embedment region known from the determination of the boundary.

The methods of determining the boundary of the embedment region and calculating the scaling ratio are, for example, a method of using a histogram illustrating positions of the detected graphic patterns.

FIG. 29A, FIG. 29B, FIG. 29C, FIG. 29D and FIG. 29E illustrate a method of determining the boundary of the embedded region using the histogram.

First, the position where the graphic pattern is embedded is detected from the all or a part of the watermarked image data 1911 of FIG. 27.

Figure 29A:
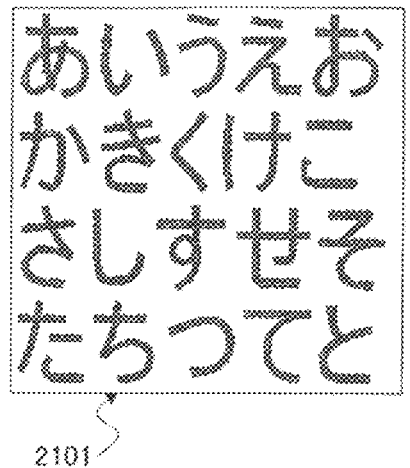
FIG. 29A, FIG. 29B, FIG. 29C, FIG. 29D, and FIG. 29E illustrate a method of determining a boundary of an embedment region from a histogram of a graphic pattern when information is detected from the graphic pattern with the information detection processing unit illustrated in FIG. 27.

For example, image data 2101 of FIG. 29A are the result of detecting the positions where the graphic patterns are embedded are detected from the watermarked image data 2904.

Because the watermarked image data are generated by applying the new graphic pattern generated with (A) the change of the arrangement of the graphic pattern or (B) the alternation of the neighbor pixels near the portion related to the signaling feature of the graphic pattern as described above, the graphic pattern is detectable with a high probability even after the watermarked image data undergo image enlargement or reduction processing, as described in reference of FIG. 14A and FIG. 14B.

Figure 29B:
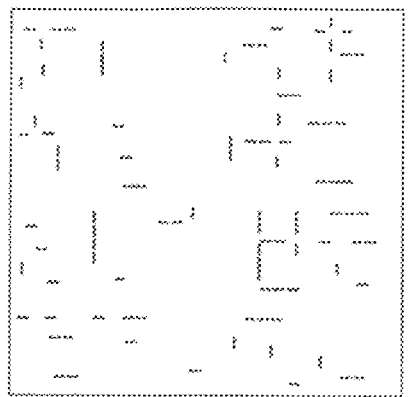
Figure 29C:
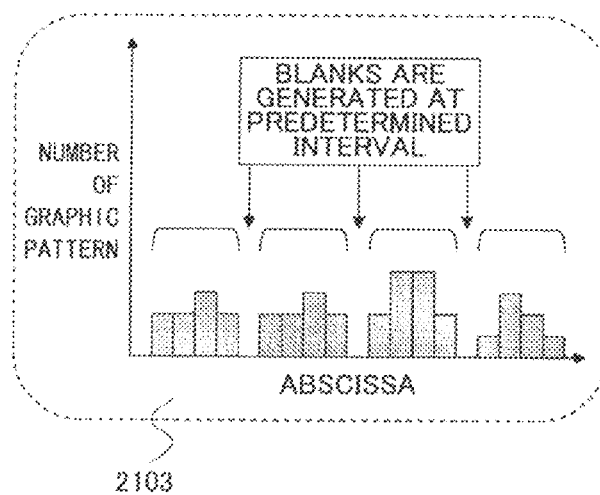

Referring back to FIG. 29A, the boundary of the embedded region and the scaling ratio S are calculated. For example, only a region (portions indicated inside an image 2102 illustrated in FIG. 29B) from which the graphic patterns are detected are extracted from the information of positions (especially dark colored portions in FIG. 29B) where the graphic patterns are embedded as illustrated in FIG. 29A. The number of the graphic patterns detected with respect to the lateral axis of FIG. 29B is illustrated as the histogram 2103 in FIG. 29C.

The histogram is not limited to that based on the lateral axis. Other histograms based on the ordinate and two-dimensional coordinate may be used.

As illustrated in FIG. 25, since the blank region where no graphic pattern is embedded is formed in the boundary portion of the embedded region, blank portions are obtained by a predetermined period in correspondence with the blank regions of the boundary portion of the embedded region of the histogram. By detecting the blank portions and the interval of the blank portions, it becomes possible to determine the boundaries of the embedded region and calculate the scaling ratio S.

Said differently, if the width of the embedment regions is n when the graphic patterns are embedded by the electronic watermark embedding device 1601, and the scaling ratio of the image enlargement or reduction process is S, the interval of the blank portions detectable by the histogram 2103 is obtained as n×S. Therefore, by obtaining the region size n (the width of the embedment region in case of the histogram 2103) when the graphic patterns are embedded, and calculating the intervals of the blank portions using the histogram as described above, it is possible to calculate back the scaling ratio S. Therefore, the scaling ratio S equals to the interval of the blank portions detected by the histogram divided by n (S=(the interval)/n).

Figure 29D:
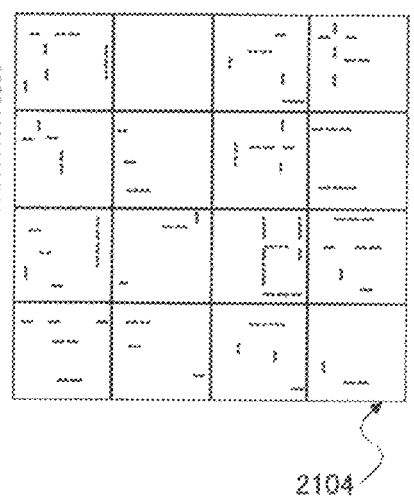

Referring to FIG. 29D, the embedment regions 2104 divided by the boundary are illustrated. The embedded regions 2104 conform to the embedment regions 2902 in FIG. 26B.

Next, information corresponding to the graphic patterns embedded in the embedment regions is determined and obtained.

Figure 29E:
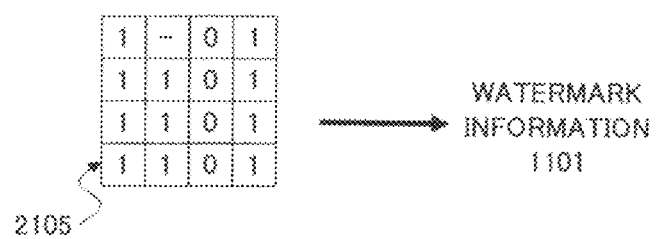

In case of the example of FIG. 29, a detection result 2105 illustrated in FIG. 29E is obtained.

The result of FIG. 29E is obtained by acquiring values of the watermark information, to which the graphic patterns correspond, based on the graphic patterns detected respectively from the embedment regions divided by the boundary as illustrated in FIG. 29D.

Referring to FIG. 29E, there are the values "1" and "0", and an indicator "-" which indicates that no graphic pattern is detected.

In this case, by conducting majority voting for embedment regions corresponding to values of identical watermark information (majority voting of elements respectively in columns of the array 2105 of FIG. 29E), it becomes possible to determine and obtain the watermark information "1", "1", "0" and "1" (determination by the above majority voting).

The electronic watermark embedding device 1601 originally generates the watermarked image data to be detected as described with reference to FIG. 22, and further generates the watermarked information array 2903 by sequentially arranging the watermark information "1101" in the direction of rows. With this method, the identical values are arranged in the direction of the rows as illustrated in FIG. 26C. However, all the values of the second thru fourth rows in the second column of the array 2105 of FIG. 29E is "1". Therefore, the unknown element "-" of the first row and the second column is determined as "1" with the majority voting.

There is probability that the all embedment information is not detected by detecting the graphic patterns only with the graphic pattern detecting unit 1904.

Therefore, it is checked whether the all embedded watermark information is detectable from the detected graphic pattern in Step S2002. Specifically, it is determined that the watermark information is undetectable (NO of Step 2002) when no graphic pattern is detected from any of the embedment regions.

On the other hand, when the detected watermark information is detectable from the information of the graphic pattern (YES of Step 2002), the watermark information 1913 is detectable.

When the watermark information 1913 is undetectable, the process goes to Step 2004. In Step 2004, when the scaling ratio S is not calculated by a reason such as non existence of the graphic pattern (NO of Step 2004), the process is completed as the detection may not be carried out.

On the other hand, when the scaling ratio is calculated (YES of Step 2004), the graphic pattern may be detected. When the scaling ratio S is calculated by the method of using the histogram or the like in reference of FIG. 29A thru FIG. 29C as this result, parameters are set again in association with the scaling ratio S, and thereafter the graphic pattern detecting unit 1904 detects the graphic pattern with the graphic pattern detecting unit 1904 again using the data 1915 set again in Step 2005.

The methods of setting again the parameter in Step 2005 are as follows: a method of detecting the graphic pattern with the graphic pattern detecting unit 1904 after changing (S times greater) the size of the graphic pattern, stored in the graphic pattern inputting unit 1903 illustrated in FIG. 27, in association with the scaling ratio S obtained in Step 2001; a method of detecting the graphic pattern with the graphic pattern detecting unit 1904 after the image data input in the image data inputting unit 1902 undergo image enlargement or reduction processing of multiplying 1/S times to recover the original size; or the like.

The image enlargement or reduction process may be the linear interpolation method in Formula 3 or the other methods.

As described, by detecting the scaling ratio S and detecting the graphic patterns in consideration of the obtained scaling ratio, further accurate detection of the graphic patterns becomes possible.

The information outputting unit 1906 converts the obtained watermark information 1906 to the original embedment information 1914 and outputs the original embedment information 1914.

When an error correction signal is included in the watermark information 1913, an error bit is corrected by the information outputting unit 1906 to thereby improve detection accuracy.

In this way, the embedment information 1914 is obtainable from the information outputting unit 1906 as information embedded in the watermarked image data 1911.

With the embodiment, the graphic patterns configured by the specific pattern are embedded in the image data as the watermark information. The graphic patterns are formed by altering the arrangement considering the enlargement and reduction after embedding the graphic patterns and the neighbor pixels near a part related to the signaling feature.

As the procedure of detecting the information, a position where the information is embedded is specified by detecting the graphic pattern from the watermarked image data, and the information corresponding to the embedded graphic pattern is detected after the graphic pattern is detected. Since the graphic patterns are dispersed and arranged inside the image data, the embedded information may be recovered even when a part of printed image data is lost. Further, the embedded information is detected from the enlarged or reduced image by generating the graphic patterns with a high probability so that the signaling feature is maintained even after the image data undergo image enlargement or reduction processing.

According to the embodiment, the following effects are obtainable.

(1) the embedment of the information with this embedding method is hard to be perceived by persons. It is possible to embed not only in characters but also drawings and ruled lines.

(2) Since the graphic patterns are expressed by the specific pattern, it is possible to stably detect the embedment information even when a thin spot or blurring is produced on the printed materials during copying, printing or the like.

(3) Since the graphic patterns maintain to have a signaling feature detectable by a filter which is not designed for an image enlargement or reduction process, it is possible to stably detect embedment information from image data even when an image enlargement process or an image reduction process such as N in 1 or size reduction occurs in the image data.

(4) It is possible to detect graphic patterns and information by calculating the scaling ratio at the time of the detection.

Figure 30:
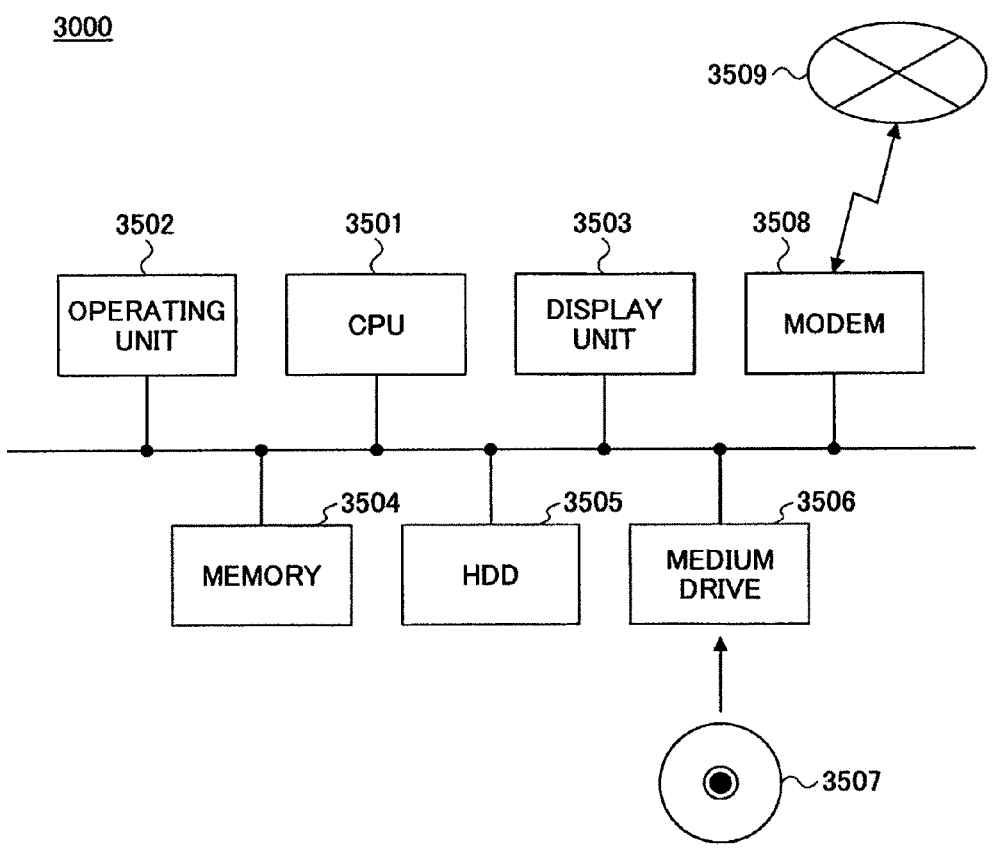
FIG. 30 is a block chart of a hardware structure illustrating the electronic watermark embedding device or the electronic watermark detecting device functioned by a computer.

FIG. 30 is a block chart of a hardware structure illustrating the electronic watermark embedding device 1601 illustrated in FIG. 22 or the electronic watermark detecting device 1901 illustrated in FIG. 27, embodied by a computer.

As illustrated in FIG. 30, a computer 3000 includes a CPU 3501 for carrying out various operations by executing instructions constituting a given program, an operating unit 3502, such as a keyboard and a mouse, for inputting by a user various operations, a display unit 3503, such as a CRT and a LCD panel, for showing a user a process and a result of the process in the CPU 3501, a memory 3504, such as a ROM and a RAM, storing the program, data or the like used by the CPU 3504 and being used as a working area, a hard disk drive (HDD) 3505 for storing the program, the data or the like, a CD-ROM drive (medium drive) 3506 for loading the program or the data from the outside via a CD-ROM 3507, and a modem 3508 for downloading the program from an external server via a communication network 3509 such as the internet and a LAN or otherwise disposed of. The computer 3000 loads or downloads a program including instructions for causing the CPU 3501 to execute the above processes via the CD-ROM 3507 or the communication network 3509. The above program causes the computer to function as the electronic watermark embedding device 1601 or the electronic watermark detecting device 1901. The above program is installed in the hard disk drive 3505, is properly loaded to the memory 3504, and is executed by the CPU 3501. As a result, the program causes the computer to function as the electronic watermark embedding device 1601 or the electronic watermark detecting device 1901.

Thus, embedment information is detectable from image data with a high probability after the image data undergo image enlargement or reduction processing. It becomes possible to provide an electronic watermark embedding device, an electronic watermark detecting device, and a program causing a computer to function as the electronic watermark embedding device or the electronic watermark detecting device, practically demonstrating excellent features.

When the period of the signaling feature of the graphic pattern is changed and the image data undergo image enlargement or reduction processing, the signaling feature may be maintained after the signaling feature is changed.

When the neighbor pixel near the signaling feature included in the graphic pattern is altered and the image data undergo image enlargement or reduction processing, the signaling feature may be maintained after the neighbor pixel near the signaling feature is altered.

When the period of the signaling feature having the embedment information is changed or the neighbor pixel near the signaling feature included in the graphic pattern is altered, and the image data embedded with the graphic pattern undergo image enlargement or reduction processing, the signaling feature included in the graphic pattern may be maintained.

When the period of the signaling feature having the embedment information is changed, and the image data embedded with the graphic pattern undergo image enlargement or reduction processing, the signaling feature originally included in the graphic pattern may be maintained after the image data undergo image enlargement or reduction processing. The graphic pattern is detectable with a high probability. Further, by detecting the detected graphic pattern, the embedded information is detectable with a high probability. When the neighbor pixel near the signaling feature of the graphic pattern including the embedment information is altered, and the image data embedded with the graphic pattern undergo image enlargement or reduction processing, the signaling feature included in the graphic pattern may be detectable with a high probability. Further, by detecting the signaling feature of the detected graphic pattern, the embedment information is detectable with a high probability.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic watermark embedding device that embeds a graphic pattern representing information in image data, the electronic watermark embedding device comprising:
    a signaling feature period changing unit configured to change a period of a signaling feature of a graphic pattern;
    a graphic pattern embedding unit configured to embed the graphic pattern in the image data as a period of the signaling feature changed by the signaling feature period changing unit; and
    an embedment region detecting unit configured to detect an embedding position where the graphic pattern is embeddable from a region of the image data other than a background,
    wherein the signaling feature period changing unit changes the period of the signaling feature of the graphic pattern while maintaining the signaling feature when the image data undergo image enlargement or reduction processing, and
    the graphic pattern embedding unit embeds the graphic pattern including a directional pattern formed by plural rectangular protrusions having widths and various lengths while interposing intervals to indicate the period of the signaling feature and a basic pattern arranged adjacent to the directional pattern so that the basic pattern is embedded in the embedding position on the region of the image data other than the background and the directional pattern is arranged in a border between the image data other than the background and the background.

2. An electronic watermark embedding device that embeds a graphic pattern representing information in image data, the electronic watermark embedding device comprising:
    a neighbor pixel altering unit configured to alter a neighbor pixel near a signaling feature included in the graphic pattern when the graphic pattern is embedded in the image data;
    a graphic pattern embedding unit configured to embed the graphic pattern in the image data to include the altered neighbor pixel in the graphic pattern; and
    an embedment region detecting unit configured to detect an embedding position where the graphic pattern is embedded from a region of the image data other than a background,
    wherein the neighbor pixel altering unit alters the neighbor pixel while maintaining the signaling feature when the image data undergo image enlargement or reduction processing, and
    the graphic pattern embedding unit embeds the graphic pattern including a directional pattern formed by plural rectangular protrusions having widths and various lengths while interposing intervals to indicate a period of the signaling feature and a basic pattern arranged adjacent to the directional pattern so that the basic pattern is embedded in the embedding position on the region of the image data other than the background and the directional pattern is arranged in a border between the image data other than the background and the background.

3. The electronic watermark embedding device according to claim 2,
    wherein the neighbor pixel altering unit alters the neighbor pixel near the signaling feature included in the graphic pattern to differ a period of the neighbor pixel from a period of the signaling feature.

4. The electronic watermark embedding device according to claim 2,
    wherein the neighbor pixel altering unit alters the neighbor pixel near the signaling feature included in the graphic pattern by changing a pixel value of the neighbor pixel.

5. The electronic watermark embedding device according to claim 2,
    wherein the neighbor pixel altering unit alters the neighbor pixel near the signaling feature included in the graphic pattern to provide the signaling feature included in the graphic pattern with an isolated point.

6. The electronic watermark embedding device according to claim 1, further comprising:
    a graphic pattern providing unit configured to provide plural types of the graphic pattern to be embedded by the graphic pattern embedding unit in association with plural scaling ratios of the image data,
    wherein the graphic pattern embedding unit is further configured to randomly select a part or all of the plural types of the graphic pattern provided by the graphic pattern providing unit, and embed the selected part or all of the plural types of the graphic pattern in the image data.

7. A non-transitory computer readable medium storing a computer program for causing a computer included in an electronic watermark embedding device that embeds a graphic pattern representing information in image data to function as:
    a signaling feature period changing unit configured to change a period of signaling feature of a graphic pattern;
    a graphic pattern embedding unit configured to embed the graphic pattern in the image data as a period of the signaling feature changed by the signaling feature period changing unit; and
    an embedment region detecting unit configured to detect an embedding position where the graphic pattern is embedded from a region of the image data other than a background,
    wherein the signaling feature period changing unit changes the period of the signaling feature of the graphic pattern while maintaining the signaling feature when the image data undergo image enlargement or reduction processing, and the graphic pattern embedding unit embeds the graphic pattern including a directional pattern formed by plural rectangular protrusions having widths and various lengths while interposing intervals to indicate the period of the signaling feature and a basic pattern arranged adjacent to the directional pattern so that the basic pattern is embedded in the embedding position on the region of the image data other than the background and the directional pattern is arranged in a border between the image data other than the background and the background.

8. A non-transitory computer readable medium storing a computer program for causing a computer included in an electronic watermark embedding device that embeds a graphic pattern representing information in image data to function as:

a neighbor pixel altering unit configured to alter a neighbor pixel near a signaling feature included in the graphic pattern when the graphic pattern is embedded in the image data;

a graphic pattern embedding unit configured to embed the graphic pattern in the image data to include the altered neighbor pixel in the graphic pattern; and an embedment region detecting unit configured to detect an embedding position where the graphic pattern is embedded from a region of the image data other than a background, wherein the neighbor pixel altering unit alters the neighbor pixel while maintaining the signaling feature when the image data undergo image enlargement or reduction processing, and the graphic pattern embedding unit embeds the graphic pattern including a directional pattern formed by plural rectangular protrusions having widths and various lengths while interposing intervals to indicate a period of the signaling feature and a basic pattern arranged adjacent to the directional pattern so that the basic pattern is embedded in the embedding position on the region of the image data other than the background and the directional pattern is arranged in a border between the image data other than the background and the background.

9. The non-transitory computer readable medium according to claim 8, wherein the neighbor pixel altering unit alters the neighbor pixel near the signaling feature included in the graphic pattern to differ a period of the neighbor pixel from a period of the signaling feature.

10. The non-transitory computer readable medium according to claim 8, wherein the neighbor pixel altering unit alters the neighbor pixel near the signaling feature included in the graphic pattern by changing a pixel value of the neighbor pixel.

11. The non-transitory computer readable medium according to claim 8, wherein the neighbor pixel altering unit alters the neighbor pixel near the signaling feature included in the graphic pattern to provide the signaling feature included in the graphic pattern with an isolated point.

12. The non-transitory computer readable medium according to claim 7, further causing the computer to function as:

a graphic pattern providing unit configured to provide plural types of the graphic pattern to be embedded by the graphic pattern embedding unit in association with plural scaling ratios of the image data, wherein the graphic pattern embedding unit is further configured to randomly select a part or all of the plural types of the graphic pattern provided by the graphic pattern providing unit, and embed the selected part or all of the plural types of the graphic pattern in the image data.

13. The electronic watermark embedding device according to claim 2, further comprising:

a graphic pattern providing unit configured to provide plural types of the graphic pattern, to be embedded by the graphic pattern embedding unit, in association with plural scaling ratios of the image data, wherein the graphic pattern embedding unit is further configured to randomly select a part or all of the plural types of the graphic pattern provided by the graphic pattern providing unit, and embed the selected part or all of the plural types of the graphic pattern in the image data.

14. The non-transitory computer readable medium according to claim 8, further comprising:

a graphic pattern providing unit configured to provide plural types of the graphic pattern, to be embedded by the graphic pattern embedding unit, in association with plural scaling ratios of the image data, wherein the graphic pattern embedding unit is further configured to randomly select a part or all of the plural types of the graphic pattern provided by the graphic pattern providing unit, and embed the selected part or all of the plural types of the graphic pattern in the image data.

* * * * *